United States Patent

Tran

[19]

[11] Patent Number: 6,070,140
[45] Date of Patent: May 30, 2000

[54] SPEECH RECOGNIZER

[76] Inventor: Bao Q. Tran, 10206 Grove Glen, Houston, Tex. 77099

[21] Appl. No.: 09/190,691

[22] Filed: Nov. 12, 1998

Related U.S. Application Data

[62] Division of application No. 08/461,646, Jun. 5, 1995, abandoned.

[51] Int. Cl.⁷ .................................................. G10L 21/06
[52] U.S. Cl. .......................................... 704/275; 704/232
[58] Field of Search ..................................... 704/200, 270, 704/231, 232, 233, 275, 251

[56] References Cited

U.S. PATENT DOCUMENTS

| | | | |
|---|---|---|---|
| 4,771,390 | 9/1988 | Dolph et al. ............................. | 395/2.83 |
| 5,319,736 | 6/1994 | Hunt ........................................ | 395/2.36 |
| 5,487,129 | 1/1996 | Paiss et al. ............................. | 395/2.42 |
| 5,548,681 | 8/1996 | Gleaves et al. ........................ | 395/2.42 |
| 5,562,453 | 10/1996 | Wen ........................................ | 434/185 |
| 5,983,186 | 11/1999 | Miyazawa et al. ..................... | 704/275 |

*Primary Examiner*—Richemond Dorvil
*Attorney, Agent, or Firm*—Kurt J. Brown

[57] ABSTRACT

A computer system has a power-down mode to conserve energy. The computer system includes a speech transducer for capturing speech; a low-energy consuming power-up indicator coupled to said speech transducer, said power-up indicator detecting speech directed at said speech transducer and asserting a wake-up signal to a powered-down processor; and a voice recognizer coupled to said speech transducer and said wake-up signal, said voice recognizer waking up from the power-down mode when said wake-up signal is asserted.

10 Claims, 18 Drawing Sheets

SPEECH RECOGNIZER

This is a divisional of application Ser. No. 08/461,646, filed Jun. 5, 1995 now abandoned.

FIELD OF THE INVENTION

This invention relates generally to a computer, and more specifically, to a computer with speech recognition capability.

BACKGROUND OF THE INVENTION

The recent development of speech recognition technology has opened up a new era of man-machine interaction. A speech user interface provides a convenient and highly natural method of data entry. However, traditional speech recognizers use complex algorithms which in turn need large storage systems and/or dedicated digital signal processors with high performance computers. Further, due to the computational complexity, these systems generally cannot recognize speech in real-time. Thus, a need exists for an efficient speech recognizer that can operate in real-time and that does not require a dedicated high performance computer.

The advent of powerful single chip computers has made possible compact and inexpensive desktop, notebook, notepad and palmtop computers. These single chip computers can be incorporated into personal items such as watches, rings, necklaces and other forms of jewelry. Because these personal items are accessible at all times, the computerization of these items delivers truly personal computing power to the users. These personal systems are constrained by the battery capacity and storage capacity. Further, due to their miniature size, the computer mounted in the watch or the jewelry cannot house a bulky keyboard for text entry or a writing surface for pen-based data entry. Thus, a need exists for an efficient speaker independent, continuous speech recognizer to act as a user interface for these tiny personal computers.

U.S. Pat. No. 4,717,261, issued to Kita, et al., discloses an electronic wrist watch with a random access memory for recording voice messages from a user. Kita et al. further discloses the use of a voice synthesizer to reproduce keyed-in characters as a voice or speech from the electronic wrist-watch. However, Kita only passively records and plays audio messages, but does not recognize the user's voice and act in response thereto.

U.S. Pat. No. 4,509,133, issued to Monbaron et al. and U.S. Pat. No. 4,573,187, issued to Bui et al. disclose watches which recognize and respond to verbal commands. These patents teach the use of preprogrammed training for the references stored in the vocabulary. When the user first uses the watch, he or she pronounces a word corresponding to a command to the watch to train the recognizer. After training, the user can repeatedly pronounce the trained word to the watch until the watch display shows the correct word on the screen of the watch. U.S. Pat. No. 4,635,286, issued to Bui et al., further discloses a speech-controlled watch having an electro-acoustic means for converting a pronounced word into an analog signal representing that word, a means for transforming the analog signal into a logic control information, and a means for transforming the logic information into a control signal to control the watch display. When a word is pronounced by a user, it is coded and compared with a part of the memorized references. The watch retains the reference whose coding is closest to that of the word pronounced. The digital information corresponding to the reference is converted into a control signal which is applied to the control circuit of the watch. Although wearable speech recognizers are shown in Bui and Monbaron, the devices disclosed therein do not provide for speaker independent speech recognition.

Another problem facing the speech recognizer is the presence of noise, as the user's verbal command and data entry may be made in a noisy environment or in an environment in which multiple speakers are speaking simultaneously. Additionally, the user's voice may fluctuate due to the user's health and mental state. These voice fluctuations severely test the accuracy of traditional speech recognizers. Thus, a need exists for an efficient speech recognizer that can handle medium and large vocabulary robustly in a variety of environments.

Yet another problem facing the portable voice recognizer is the power consumption requirement. Additionally, traditional speech recognizers require the computer to continuously monitor the microphone for verbal activities directed at the computer. However, the continuous monitoring for speech activity even during an extended period of silence wastes a significant amount of battery power. Hence, a need exists for a low-power monitoring of speech activities to wake-up a powered-down computer when commands are being directed to the computer.

Speech recognition is particularly useful as a data entry tool for a personal information management (PIM) system, which tracks telephone numbers, appointments, travel expenses, time entry, note-taking and personal data collection, among others. Although many personal organizers and handheld computers offer PIM capability, these systems are largely under-utilized because of the tedious process of keying in the data using a miniaturized keyboard. Hence, a need exists for an efficient speech recognizer for entering data to a PIM system.

SUMMARY OF THE INVENTION

In the present invention, a speech transducer captures sound and delivers the data to a robust and efficient speech recognizer. To minimize power consumption, a voice wake-up indicator detects sounds directed at the voice recognizer and generates a power-up signal to wake up the speech recognizer from a powered-down state. Further, to isolate speech in noisy environments, a robust high order speech transducer comprising a plurality of microphones positioned to collect different aspects of sound is used. Alternatively, the high order speech transducer may consist of a microphone and a noise canceller which characterizes the background noise when the user is not speaking and subtracts the background noise when the user is speaking to the computer to provide a cleaner speech signal.

The user's speech signal is next presented to a voice feature extractor which extracts features using linear predictive coding, fast Fourier transform, auditory model, fractal model, wavelet model, or combinations thereof. The input speech signal is compared with word models stored in a dictionary using a template matcher, a fuzzy logic matcher, a neural network, a dynamic programming system, a hidden Markov model, or combinations thereof. The word model is stored in a dictionary with an entry for each word, each entry having word labels and a context guide.

A word preselector receives the output of the voice feature extractor and queries the dictionary to compile a list of candidate words with the most similar phonetic labels. These candidate words are presented to a syntax checker for selecting a first representative word from the candidate words, as ranked by the context guide and the grammar structure, among others. The user can accept or reject the first representative word via a voice user interface. If rejected, the voice user interface presents the next likely word selected from the candidate words. If all the candidates are rejected by the user or if the word does not exist in the dictionary, the system can generate a predicted word based on the labels. Finally, the voice recognizer also allows the user to manually enter the word or spell the word out for the system. In this manner, a robust and efficient human-machine interface is provided for recognizing speaker independent, continuous speech.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE INVENTION

Figure 1:
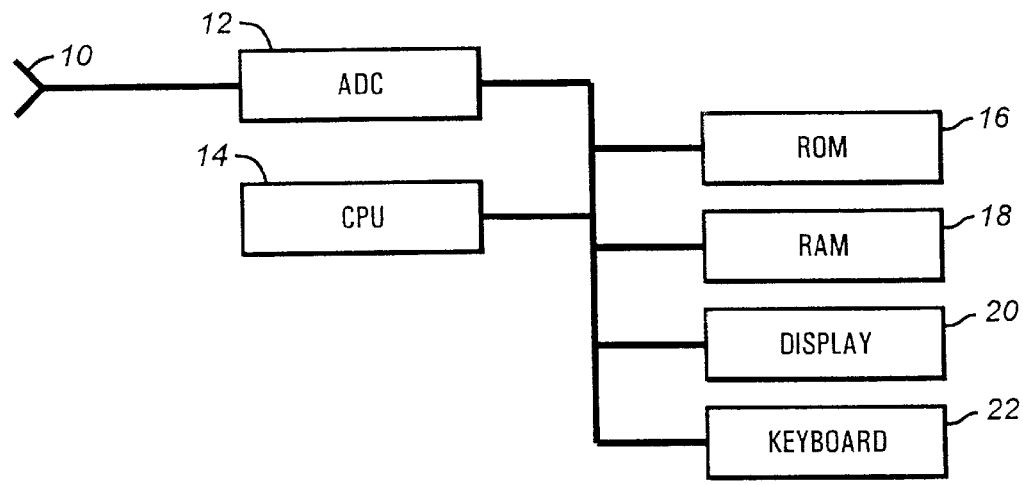
FIG. 1 is a block diagram of a computer system for capturing and processing a speech signal from a user.

Referring now to FIG. 1, a general purpose architecture for recognizing speech is illustrated as shown in FIG. 1, a microphone 10 is connected to an analog to digital converter (ADC) 12 which interfaces with a central processing unit (CPU) 14. The CPU 14 in turn is connected to a plurality of devices, including a read-only-memory (ROM) 16, a random access memory (RAM) 18, a display 20 and a keyboard 22. For portable applications, in addition to using low power devices, the CPU 14 has a power-down mode where non-essential parts of the computer are placed in a sleep mode once they are no longer needed to conserve energy. However, to detect the presence of voice commands, the computer needs to continually monitor the output of the ADC 12, thus unnecessarily draining power even during an extended period of silence. This requirement thus defeats the advantages of power-down.

Figure 2:
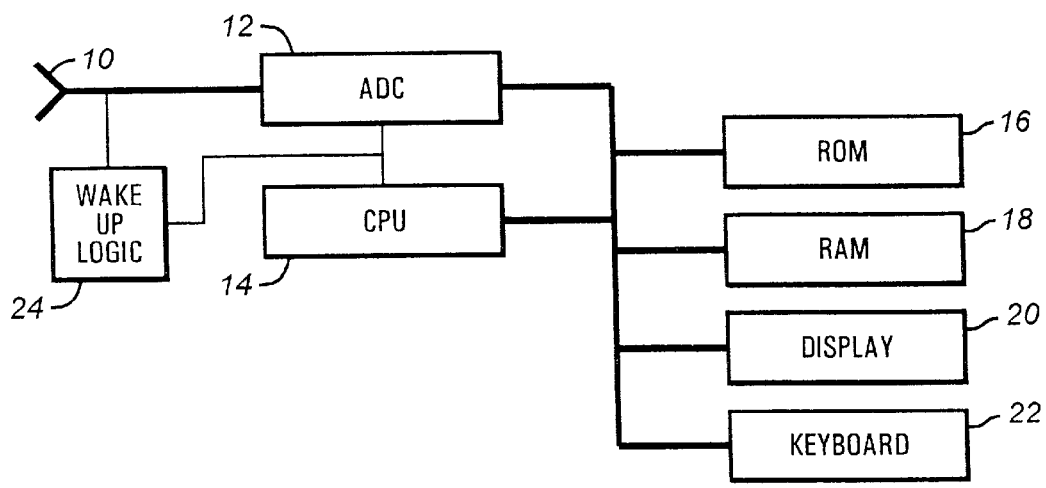
FIG. 2 is a block diagram of a computer system with a wake-up logic in accordance with one aspect of the invention.

FIG. 2 discloses one aspect of the invention which wakes up the computer from its sleep mode when spoken to without requiring the CPU to continuously monitor the ADC output. As shown in FIG. 2, a wake-up logic 24 is connected to the output of microphone 10 to listen for commands being directed at the computer during the power-down periods. The wake-up logic 24 is further connected to the ADC 12 and the CPU 14 to provide wake-up commands to turn-on the computer in the event a command is being directed at the computer.

Figure 3:
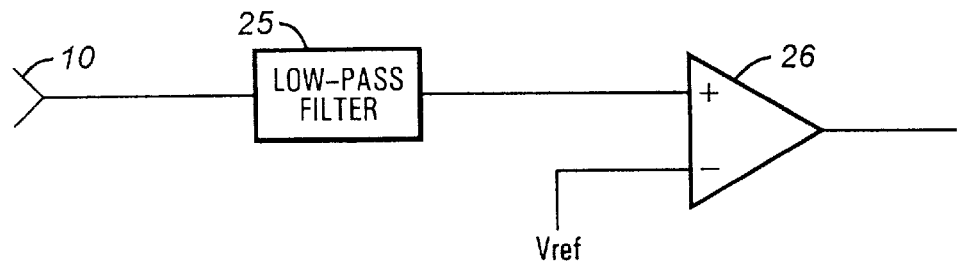
FIG. 3 is a circuit block diagram of the wake-up logic in accordance with one aspect of the invention shown in FIG. 2.

The wake-up logic of the present invention can be implemented in a number of ways. In FIG. 3, the output of the microphone 10 is presented to one or more stages of low-pass filters 25 to preferably limit the detector to audio signals below two kilohertz. The wake-up logic block 24 comprises a power comparator 26 connected to the filters 25 and a threshold reference voltage.

As shown in FIG. 3, sounds captured by the microphone 10, including the voice and the background noise, are applied to the power comparator 26, which compares the signal power level with a power threshold value and outputs a wake-up signal to the ADC 12 and the CPU 14 as a result of the comparison. Thus, when the analog input is voice, the comparator output asserts a wake-up signal to the computer. The power comparator 26 is preferably a Schmidt trigger comparator. The threshold reference voltage is preferably a floating DC reference which allows the use of the detector under varying conditions of temperature, battery supply voltage fluctuations, and battery supply types.

Figure 4:
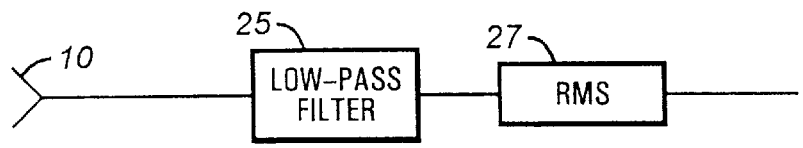
FIG. 4 is a circuit block diagram of the wake-up logic in accordance with another aspect of the invention shown in FIG. 2.

FIG. 4 shows an embodiment of the wake-up logic 24 suitable for noisy environments. In FIG. 4, a root-mean-square (RMS) device 27 is connected to the output of the microphone 10, after filtering by the low-pass filter 25, to better distinguish noise from voice and wake-up the computer when the user's voice is directed to the computer. The RMS of any voltage over an interval T is defined to be:

$$\text{RMS} = \sqrt{\frac{1}{T}\int_0^T f(t)^2 dt}$$

Figure 5:
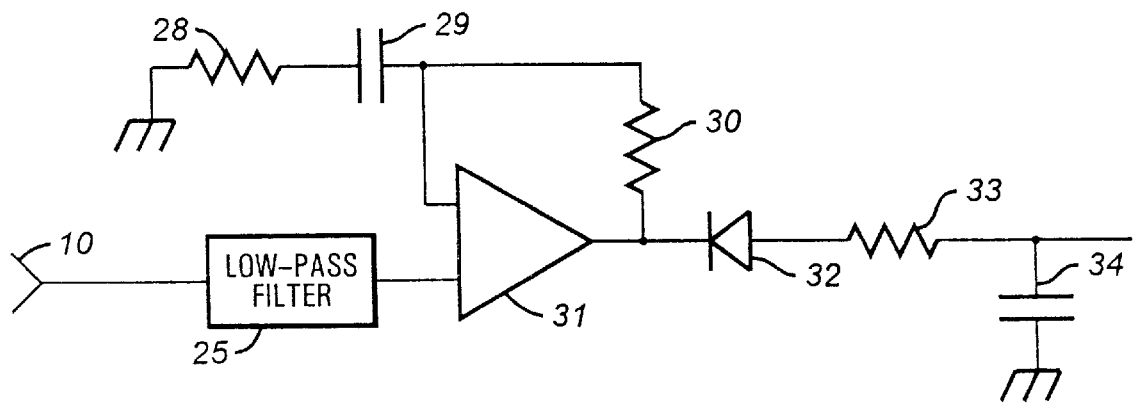
FIG. 5 is a circuit block diagram of the wake-up logic in accordance with one aspect of the invention shown in FIG. 4.

FIG. 5 shows in greater detail a low-power implementation of the RMS device 27. In FIG. 5, an amplifier 31 is connected to the output of filter 25 at one input. At the other input of amplifier 31, a capacitor 29 is connected in series with a resistor 28 which is grounded at the other end. The output of amplifier 31 is connected to the input of amplifier 31 and capacitor 29 via a resistor 30. A diode 32 is connected to the output of amplifier 31 to rectify the waveform. The rectified sound input is provided to a low-pass filter, comprising a resistor 33 connected to a capacitor 34 to create a low-power version of the RMS device. The RC time constant is chosen to be considerably longer than the longest period present in the signal, but short enough to follow variations in the signal's RMS value without inducing excessive delay errors. The output of the RMS circuit is converted to a wake-up pulse to activate the computer system. Although half-wave rectification is shown, full-wave rectification can be used. Further, other types of RMS device known in the art can also be used.

Figure 6:
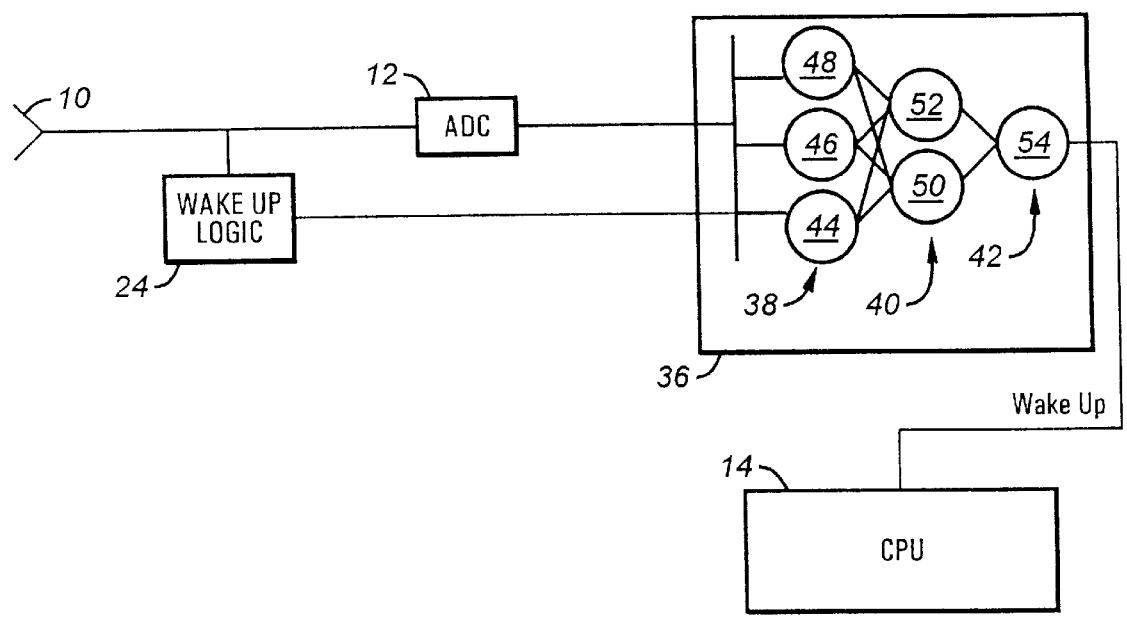
FIG. 6 is a block diagram of the wake-up logic in accordance with another aspect of the invention shown in FIG. 2.

FIG. 6 shows another embodiment of the wake-up logic 24 more suitable for multi-speaker environments. In FIG. 6, a neural network 36 is connected to the ADC 12, the wake-up logic 24 and the CPU 14. When the wake-up logic 24 detects speech being directed to the microphone 10, the wake-up logic 24 wakes up the ADC 12 to acquire sound data. The wake-up logic 24 also wakes up the neural network 36 to examine the sound data for a wake-up command from the user. The wake-up command may be as simple as the word "wake-up" or may be a preassigned name for the computer to cue the computer that commands are being directed to it, among others. The neural network is trained to detect one or more of these phrases, and upon detection, provides a wake-up signal to the CPU 14. The neural network 36 preferably is provided by a low-power microcontroller or programmable gate array logic to minimize power consumption. After the neural network 36 wakes up the CPU 14, the neural network 36 then puts itself to sleep to conserve power. Once the CPU 14 completes its operation and before the CPU 14 puts itself to sleep, it reactivates the neural network 36 to listen for the wake-up command.

A particularly robust architecture for the neural network 36 is referred to as the back-propagation network. The training process for back-propagation type neural networks starts by modifying the weights at the output layer. Once the weights in the output layer have been altered, they can act as targets for the outputs of the middle layer, changing the weights in the middle layer following the same procedure as above. This way the corrections are back-propagated to eventually reach the input layer. After reaching the input layer, a new test is entered and forward propagation takes place again. This process is repeated until either a preselected allowable error is achieved or a maximum number of training cycles has been executed.

Referring now to FIG. 6, the first layer of the neural network is the input layer 38, while the last layer is the output layer 42. Each layer in between is called a middle layer 40. Each layer 38, 40, or 42 has a plurality of neurons, or processing elements, each of which is connected to some or all the neurons in the adjacent layers. The input layer 38 of the present invention comprises a plurality of units 44, 46 and 48, which are configured to receive input information from the ADC 12. The nodes of the input layer does not have any weight associated with it. Rather, its sole purpose is to store data to be forward propagated to the next layer. A middle layer 40 comprising a plurality of neurons 50 and 52 accepts as input the output of the plurality of neurons 44–48 from the input layer 38. The neurons of the middle layer 40 transmit output to a neuron 54 in the output layer 42 which generates the wake-up command to CPU 14.

The connections between the individual processing units in an artificial neural network are also modeled after biological processes. Each input to an artificial neuron unit is weighted by multiplying it by a weight value in a process that is analogous to the biological synapse function. In biological systems, a synapse acts as a connector between one neuron and another, generally between the axon (output) end of one neuron and the dendrite (input) end of another cell. Synaptic junctions have the ability to enhance or inhibit (i.e., weigh) the output of one neuron as it is inputted to another neuron. Artificial neural networks model the enhance or inhibit function by weighing the inputs to each artificial neuron. During operation, the output of each neuron in the input layer is propagated forward to each input of each neuron in the next layer, the middle layer. The thus arranged neurons of the input layer scans the inputs which are neighboring sound values and after training using techniques known to one skilled in the art, detects the appropriate utterance to wake-up the computer. Once the CPU 14 wakes up, the neural network 36 is put to sleep to conserve power. In this manner, power consumption is minimized while retaining the advantages of speech recognition.

Figure 7:
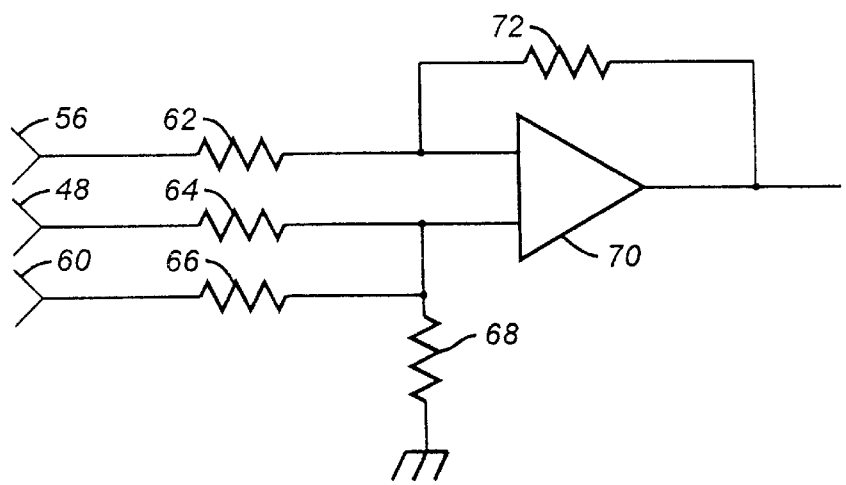
FIG. 7 is a block diagram of a computer system with a high order noise cancelling sound transducer in accordance with another aspect of the present invention.

Although an accurate speech recognition by humans or computers requires a quiet environment, such a requirement is at times impracticable. In noisy environments, the present invention provides a high-order, gradient noise cancelling microphone to reject noise interference from distant sources. The high-order microphone is robust to noise because it precisely balances the phase and amplitude response of each acoustical component. A high-order noise cancelling microphone can be constructed by combining outputs from lower-order microphones. As shown in FIG. 7, one embodiment with a first order microphone is built from three zero order, or conventional pressure-based, microphones. Each microphone is positioned in a port located such that the port captures a different sample of the sound field.

The microphones of FIG. 7 are preferably positioned as far away from each other as possible to ensure that different samples of the sound field are captured by each microphone. If the noise source is relatively distant and the wavelength of the noise is sufficiently longer than the distance between the ports, the noise acoustics differ from the user's voice in the magnitude and phase. For distant sounds, the magnitude of the sound waves arriving at the microphones are approximately equal with a small phase difference among them. For sound sources close to the microphones, the magnitude of the local sound dominates that of the distant sounds. After the sounds are captured, the sound pressure at the ports adapted to receive distant sounds are subtracted and converted into an electrical signal for conversion by the ADC 12.

As shown in FIG. 7, a first order microphone comprises a plurality of zero order microphones 56, 58 and 60. The microphone 56 is connected to a resistor 62 which is connected to a first input of an analog multiplier 70. Microphones 58 and 60 are connected to resistors 64 and 66, which are connected to a second input of the analog multiplier 70. A resistor 68 is connected between ground and the second input of the analog multiplier 70. The output of the analog multiplier 70 is connected to the first input of the analog multiplier 70 via a resistor 72. In this embodiment, microphones 56 and 58 are positioned to measure the distant sound sources, while the microphone 60 is positioned toward the user. The configured multiplier 70 takes the difference of the sound arriving at microphones 56, 58 and 60 to arrive at a less noisy representation of the user's speech. Although FIG. 7 illustrates a first order microphone for cancelling noise, any high order microphones such as a second order or even third order microphone can be utilized for even better noise rejection. The second order microphone is built from a pair of first order microphones, while a third order microphone is constructed from a pair of second order microphone.

Additionally, the outputs of the microphones can be digitally enhanced to separate the speech from the noise. As disclosed in U.S. Pat. No. 5,400,409, issued to Linhard, the noise reduction is performed with two or more channels such that the temporal and acoustical signal properties of speech and interference are systematically determined. Noise reduction is first executed in each individual channel. After noise components have been estimated during speaking pauses, a spectral substraction is performed in the spectral range that corresponds to the magnitude. In this instance the temporally stationary noise components are damped.

Point-like noise sources are damped using an acoustic directional lobe which, together with the phase estimation, is oriented toward the speaker with digital directional filters at the inlet of the channels. The pivotable, acoustic directional lobe is produced for the individual voice channels by respective digital directional filters and a linear phase estimation to correct for a phase difference between the two channels. The linear phase shift of the noisy voice signals is determined in the power domain by means of a specific number of maxima of the cross-power density. Thus, each of the first and second related signals is transformed into the frequency domain prior to the step of estimating, and the phase correction and the directional filtering are carried out in the frequency domain. This method is effective with respect to noises and only requires a low computation expenditure. The directional filters are at a fixed setting. The method assumes that the speaker is relatively close to the microphones, preferably within 1 meter, and that the speaker only moves within a limited area. Non-stationary and stationary point-like noise sources are damped by means of this spatial evaluation. Because noise reduction cannot take place error-free, distortions and artificial insertions such as "musical tones" can occur due to the spatial separation of the receiving channels (microphones at a specific spacing). When the individually-processed channels are combined, an averaging is performed to reduce these errors.

The composite signal is subsequently further processed with the use of cross-correlation of the signals in the individual channels, thus damping diffuse noise and echo components during subsequent processing. The individual voice channels are subsequently added whereby the statistical disturbances of spectral subtraction are averaged. Finally, the composite signal resulting from the addition is subsequently processed with a modified coherence function to damp diffuse noise and echo components. The thus disclosed noise canceller effectively reduces noise using minimal computing resources.

Figure 8:
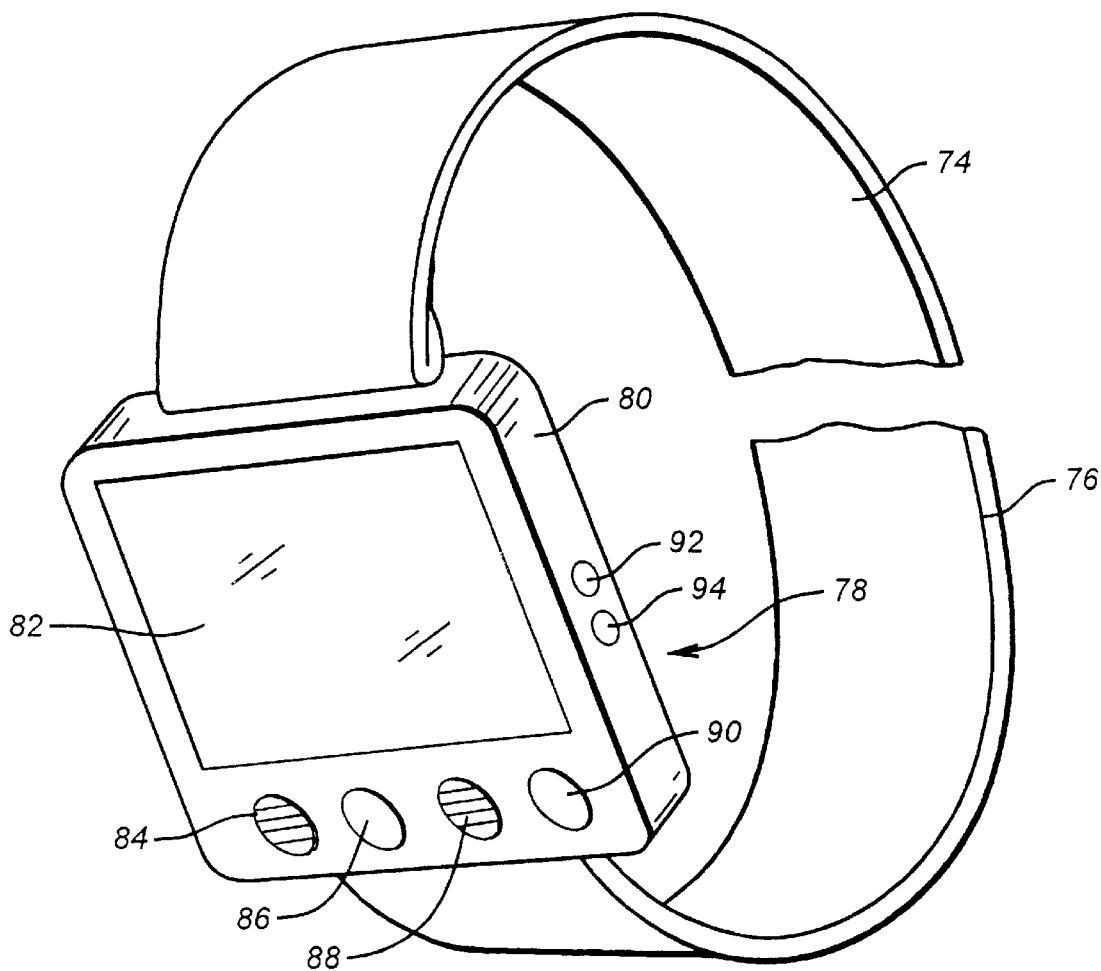
FIG. 8 is a perspective view of a watch-sized computer system in accordance with another aspect of the present invention.

FIG. 8 shows a portable embodiment of the present invention where the voice recognizer is housed in a wristwatch. As shown in FIG. 8, the personal computer includes a wrist-watch sized case 80 supported on a wrist band 74. The case 80 may be of a number of variations of shape but can be conveniently made a rectangular, approaching a box-like configuration. The wrist-band 74 can be an expansion band or a wristwatch strap of plastic, leather or woven material. The wrist-band 74 further contains an antenna 76 for transmitting or receiving radio frequency signals. The wristband 74 and the antenna 76 inside the band are mechanically coupled to the top and bottom sides of the wrist-watch housing 80. Further, the antenna 76 is electrically coupled to a radio frequency transmitter and receiver for wireless communications with another computer or another user. Although a wrist-band is disclosed, a number of substitutes may be used, including a belt, a ring holder, a brace, or a bracelet, among other suitable substitutes known to one skilled in the art.

The housing 80 contains the processor and associated peripherals to provide the human-machine interface. A display 82 is located on the front section of the housing 80. A speaker 84, a microphone 88, and a plurality of push-button switches 86 and 90 are also located on the front section of housing 80. An infrared transmitter LED 92 and an infrared receiver LED 94 are positioned on the right side of housing 80 to enable the user to communicate with another computer using infrared transmission.

Figure 9:
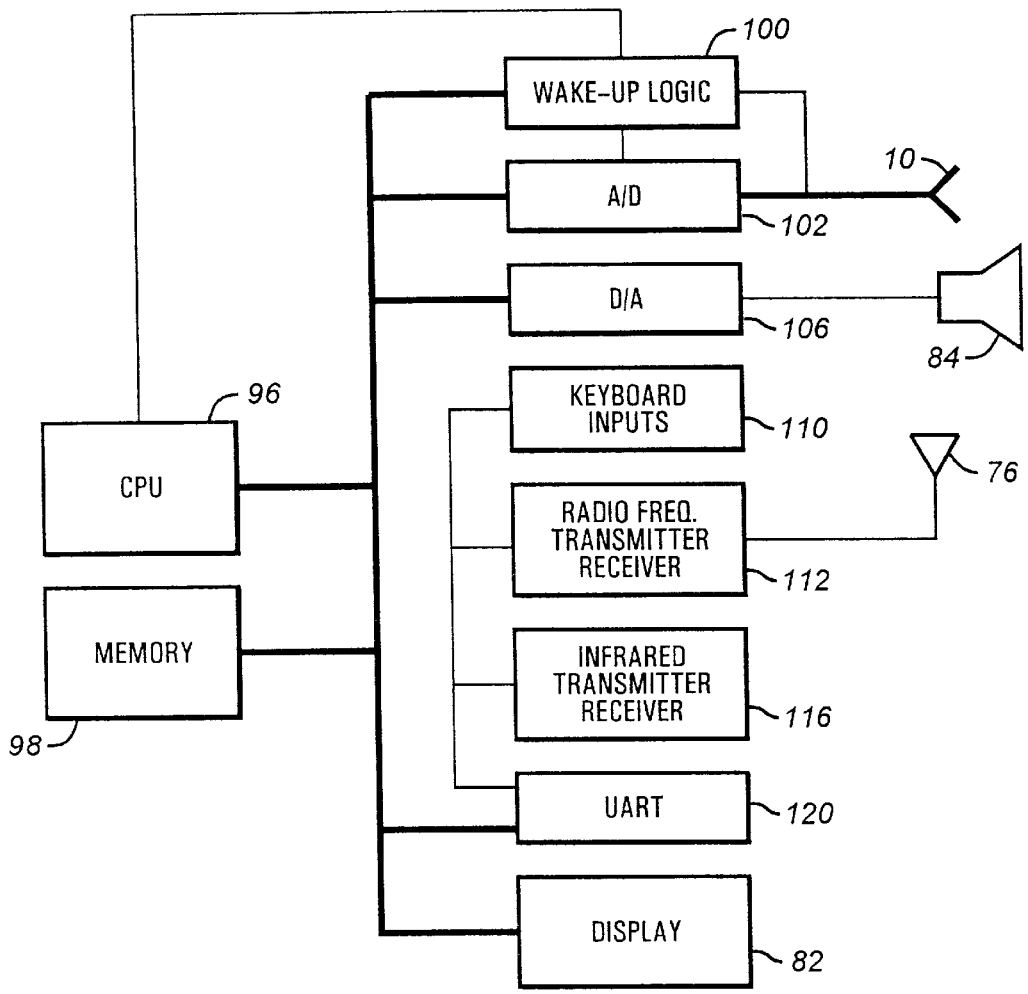
FIG. 9 is a block diagram of the computer system of FIG. 8 in accordance with another aspect of the invention.

FIG. 9 illustrates the electronic circuitry housed in the watch case 80 for detecting utterances of spoken words by the user, and converting the utterances into digital signals. The circuitry for detecting and responding to verbal commands includes a central processing unit (CPU) 96 connected to a ROM/RAM memory 98 via a bus. The CPU 96 is a preferably low power 16-bit or 32-bit microprocessor and the memory 98 is preferably a high density, low-power RAM. The CPU 96 is coupled via the bus to a wake-up logic 100, an ADC 102 which receives speech input from the microphone 10. The ADC converts the analog signal produced by the microphone 10 into a sequence of digital values representing the amplitude of the signal produced by the microphone 10 at a sequence of evenly spaced times. The CPU 96 is also coupled to a digital to analog (D/A) converter 106, which drives the speaker 84 to communicate with the user. Speech signals from the microphone are first amplified, pass through an antialiasing filter before being sampled. The front-end processing includes an amplifier, a bandpass filter to avoid antialiasing, and an analog-to-digital (A/D) converter 102 or a codec. To minimize space, the ADC 102, the DAC 106 and the interface for switches 86 and 90 may be integrated into one integrated circuit to save space.

The resulting data may be compressed to reduce the storage and transmission requirements. Compression of the data stream may be accomplished via a variety of speech coding techniques such as a vector quantizer, a fuzzy vector quantizer, a code excited linear predictive coders (CELP), or a fractal compression approach. Further, one skilled in the art can provide a channel coder to protect the data stream from the noise and the fading that are inherent in a radio channel.

Figure 10:
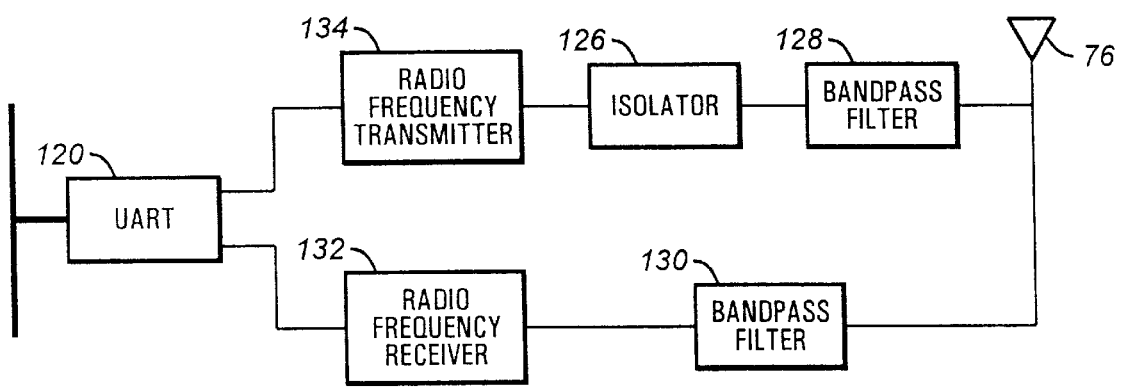
FIG. 10 is a block diagram of a RF transmitter/receiver system of FIG. 9.

The CPU 96 is also connected to an radio frequency (RF) transmitter/receiver 112, an infrared transceiver 116, the display 82 and a Universal Asynchronous Receive Transmit (UART) device 120. As shown in FIG. 10, the radio frequency (RF) transmitter and receiver 112 are connected to the antenna 76. The transmitter portion 124 converts the digital data, or a digitized version of the voice signal, from UART 120 to a radio frequency (RF), and the receiver portion 132 converts an RF signal to a digital signal for the computer, or to an audio signal to the user. An isolator 126 decouples the transmitter output when the system is in a receive mode. The isolator 126 and RF receiver portion 132 are connected to bandpass filters 128 and 130 which are connected to the antenna 76. The antenna 76 focuses and converts RF energy for reception and transmission into free space.

Figure 11:
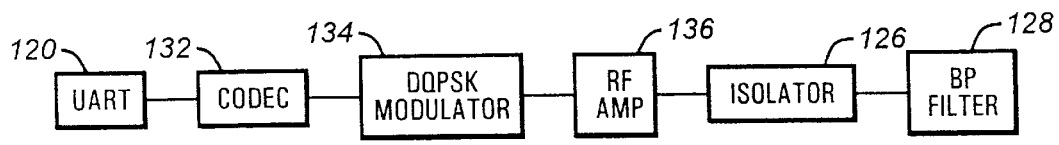
FIG. 11 is a block diagram of the RF transmitter of FIG. 10.

The transmitter portion 124 is shown in more detail in FIG. 11. As shown in FIG. 11, the data is provided to a coder 132 prior going into a differential quaternary phase-shift keying (DQPSK) modulator 134. Because the modulator 134 groups two bits at a time to create a symbol, four levels of modulation are possible. The DQPSK is implemented using a pair of digital to analog converters, each of which is connected to a multiplier to vary the phase shifted signals. The two signals are summed to form the final phase-shifted carrier.

The frequency conversion of the modulated carrier is next carried in several stages in order to reach the high frequency RF range. The output of the DQPSK modulator 134 is fed to an RF amplifier 136, which boosts the RF modulated signal to the output levels. Preferably, linear amplifiers are used for the DQPSK to minimize phase distortion. The output of the amplifier is coupled to the antenna 76 via a transmitter/receiver isolator 126, preferably a PN switch. The use of a PN switch rather than a duplexer eliminates the phase distortion and the power loss associated with a duplexer. The output of the isolator 126 is connected to the bandpass filter 128 before being connected to the antenna 76.

Figure 12:
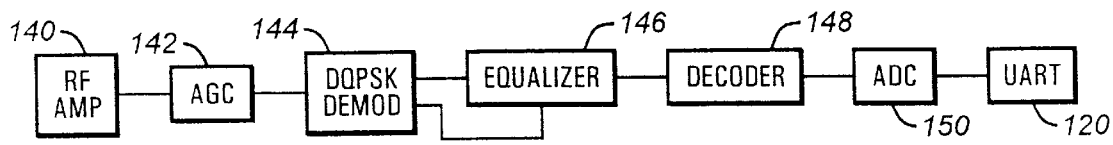
FIG. 12 is a block diagram of the RF receiver of FIG. 10.

As shown in FIG. 12, the receiver portion 132 is coupled to the antenna 76 via the bandpass filter 130. The signal is fed to a receiver RF amplifier 140, which increases the low-level DPQSK RF signal to a workable range before feeding it to the mixer section. The receiver RF amplifier 140 is a broadband RF amplifier, which preferably has a variable gain controlled by an automatic gain controller (AGC) 142 to compensate for the large dynamic range of the received signal. The AGC also reduces the gain of the sensitive RF amplifier to eliminate possible distortions caused by overdriving the receiver.

The frequency of the received carrier is stepped down to a lower frequency called the intermediate frequency (IF) using a mixer to mix the signal with the output of a local oscillator. The oscillator source is preferably varied so that the IF is a constant frequency. Typically, a second mixer superheterodynes the first IF with another oscillator source to produce a much lower frequency than the first IF. This enables the design of the narrow-band filters.

The output of the IF stage is delivered to a DQPSK demodulator 144 to extract data from the IF signal. Preferably, a local oscillator with a 90 degree phase-shifted signal is used. The demodulator 144 determines which decision point the phase has moved to and then determines which symbol is transmitted by calculating the difference between the current phase and the last phase to receive signals from a transmitter source having a differential modulator. An equalizer 146 is connected to the output of the demodulator 144 to compensate for RF reflections which vary the signal level. Once the symbol has been identified, the two bits are decoded using decoder 148. The output of the demodulator is provided to an analog to digital converter 150 with a reconstruction filter to digitize the received signal, and eventually delivered to the UART 120 which transmits or receives the serial data stream to the computer.

Figure 13:
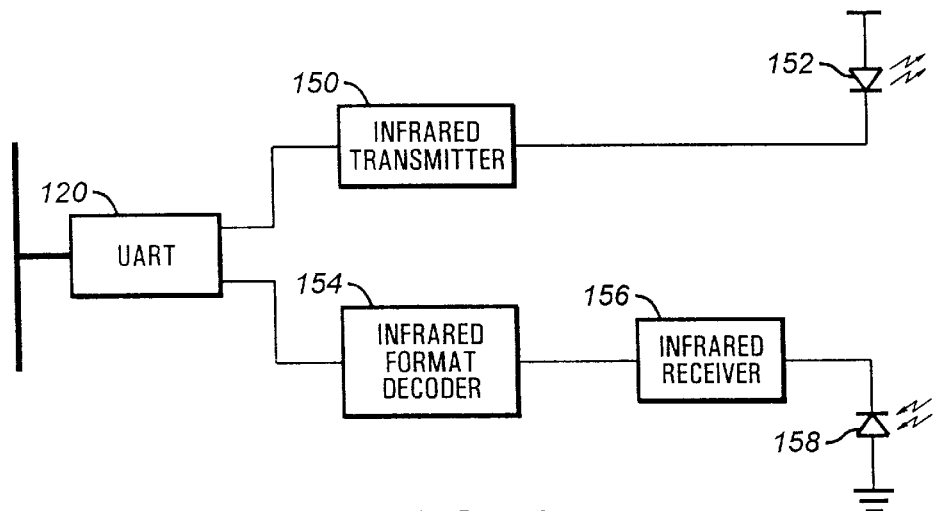
FIG. 13 is a block diagram of an optical transmitter/receiver system of FIG. 9.

In addition to the RF port, an infrared port 116 is provided available for data transmission. The infrared port 116 is a half-duplex serial port using infrared light as a communication channel. As shown in FIG. 13, the UART 120 is coupled to an infrared transmitter 150, which converts the output of the UART 120 into the infrared output protocol and then initiating data transfer by turning an infrared LED 152 on and off. The LED preferably transmits at a wavelength of 940 nanometers.

When the UART 120 is in a receive mode, the infrared receiver LED 158 converts the incoming light beams into a digital form for the computer. The incoming light pulse is transformed into a CMOS level digital pulse by the infrared receiver 156. The infrared format decoder 154 then generates the appropriate serial bit stream which is sent to the UART 120. The thus described infrared transmitter/receiver enables the user to update information stored in the computer to a desktop computer. In the preferred embodiment, the infrared port is capable of communicating at 2400 baud. The mark state, or logic level "1", is indicated by no transmission. The space state, or logic low, is indicated by a single 30 millisecond infrared pulse per bit. Using 2400 baud, a bit takes 416 milliseconds to transmit. The software to transmit or receive via the infrared transmitter and receiver is similar to that for serial communication, with the exception that the infrared I/O port will receive everything it sends due to reflections and thus must be software compensated.

Figure 14:
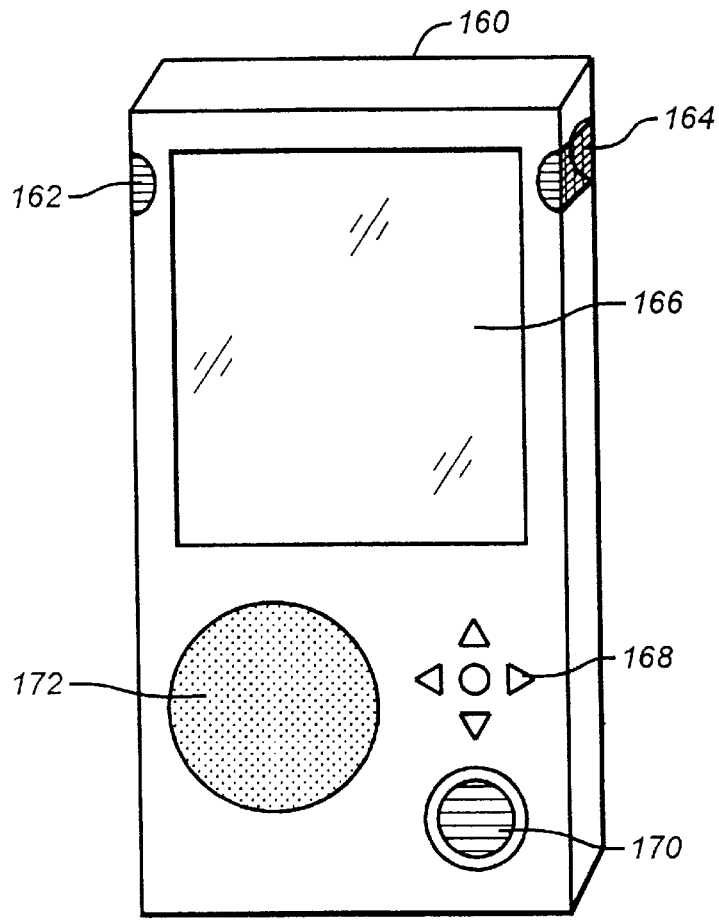
FIG. 14 is a perspective view of a hand-held computer system in accordance with another aspect of the present invention.
Figure 15:
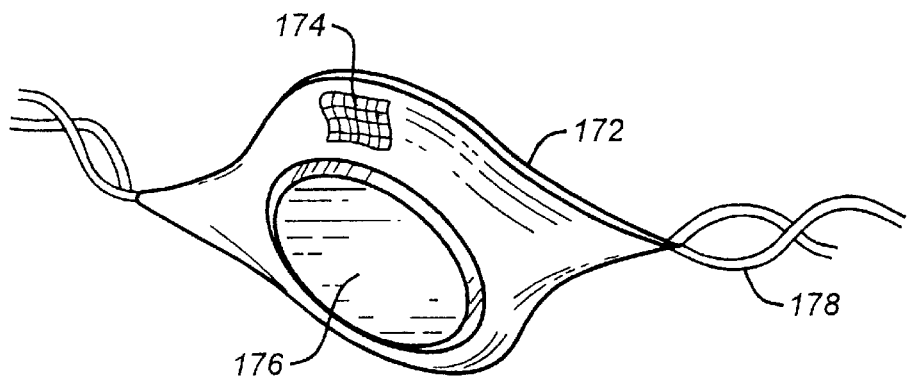
FIG. 15 is a perspective view of a jewelry-sized computer system in accordance with yet another aspect of the present invention.

FIGS. 14 and 15 show two additional embodiments of the portable computer with speech recognition. In FIG. 14, a handheld recorder is shown. The handheld recorder has a body 160 comprising microphone ports 162, 164 and 170 arranged in a first order noise cancelling microphone arrangement. The microphones 162 and 164 are configured to optimally receive distant noises, while the microphone 170 is optimized for capturing the user's speech. As shown in FIG. 14, a touch sensitive display 166 and a plurality of keys 168 are provided to capture hand inputs. Further, a speaker 172 is provided to generate a verbal feedback to the user.

Turning now to FIG. 15, a jewelry-sized computer with speech recognition is illustrated. In this embodiment, a body 172 houses a microphone port 174 and a speaker port 176. The body 172 is coupled to the user via the necklace 178 so as to provide a personal, highly accessible personal computer. Due to space limitations, voice input/output is one of the most important user interface of the jewelry-sized computer. Although a necklace is disclosed, one skilled in the art can use a number of other substitues such as a belt, a brace, a ring, or a band to secure the jewelry-sized computer to the user. One skilled in the art can also readily adapt the electronics of FIG. 9 to operate with the embodiment of FIG. 15.

Figure 16:
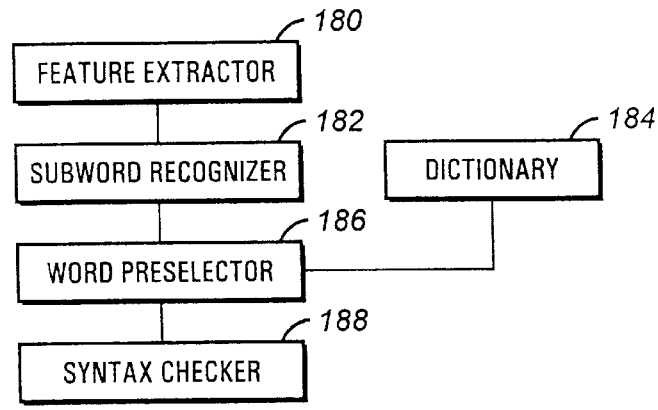
FIG. 16 is a block diagram of the processing blocks of the speech recognizer of the present invention.

As shown in FIG. 16, the basic processing blocks of the computer with speech recognition capability are disclosed.

In FIG. 16, once the speech signal has been digitized and captured into the memory by the ADC 12, the digitized speech signal is parameterized into acoustic features by a feature extractor 180. The output of the feature extractor is delivered to a sub-word recognizer 182. A word preselector 186 receives the prospective sub-words from the sub-word recognizer 182 and consults a dictionary 184 to generate word candidates. A syntax checker 188 receives the word candidates and selects the best candidate as being representative of the word spoken by the user.

With respect to the feature extractor 180, a wide range of techniques is known in the art for representing the speech signal. These include the short time energy, the zero crossing rates, the level crossing rates, the filter-bank spectrum, the linear predictive coding (LPC), and the fractal method of analysis. In addition, vector quantization may be utilized in combination with any representation techniques. Further, one skilled in the art may use an auditory signal-processing model in place of the spectral models to enhance the system's robustness to noise and reverberation.

Figure 17:
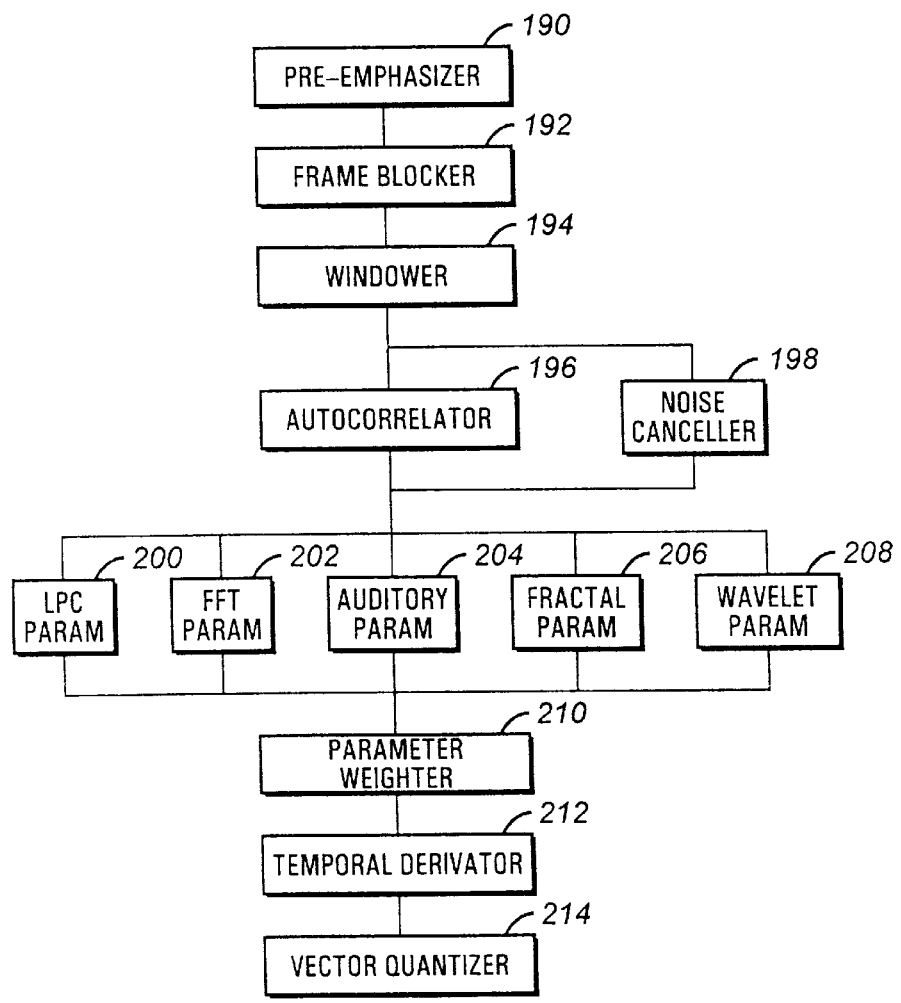
FIG. 17 is an expanded diagram of a feature extractor of the speech recognizer of FIG. 16.

The preferred embodiment of the feature extractor 180 is shown in FIG. 17. The digitized speech signal series s(n) is put through a low-order filter, typically a first-order finite impulse response filter, to spectrally flatten the signal and to make the signal less susceptible to finite precision effects encountered later in the signal processing. The signal is pre-emphasized preferably using a fixed pre-emphasis network, or preemphasizer 190. The signal can also be passed through a slowly adaptive pre-emphasizer. The output of the pre-emphasizer 190 is related to the speech signal input s(n) by a difference equation:

$$\tilde{s}(n) = s(n) - 0.9375 s(n-1)$$

The coefficient for the s(n-1) term is 0.9375 for a fixed point processor. However, it may also be in the range of 0.9 to 1.0.

The preemphasized speech signal is next presented to a frame blocker 192 to be blocked into frames of N samples with adjacent frames being separated by M samples. Preferably N is in the range of 400 samples while M is in the range of 100 samples. Accordingly, frame 1 contains the first 400 samples. The frame 2 also contains 400 samples, but begins at the 300th sample and continues until the 700th sample. Because the adjacent frames overlap, the resulting LPC spectral analysis will be correlated from frame to frame. Accordingly, frame 1 of speech is indexed as:

$$x_1(n) = \tilde{s}(Ml + n)$$

where n=0 ... N−1 and l=0 ... L−1.

Each frame must be windowed to minimize signal discontinuities at the beginning and end of each frame. The windower 194 tapers the signal to zero at the beginning and end of each frame. Preferably, the window 194 used for the autocorrelation method of LPC is the Hamming window, computed as:

$$\tilde{x}_1(n) = x_1(n) w(n)$$

$$w(n) = 0.54 - 0.46 \cos\left(\frac{2\pi n}{N-1}\right)$$

where n=0 ... N−1. Each frame of windowed signal is next autocorrelated by an autocorrelator 196 to give:

$$r(m) = \sum_{n=0}^{N-1-m} \tilde{x}_l(n) \tilde{x}_l(n+m)$$

where m=0 ... p. The highest autocorrelation value p is the order of the LPC analysis which is preferably is 8.

A noise canceller 198 operates in conjunction with the autocorrelator 196 to minimize noise in the event the high-order noise cancellation arrangement of FIG. 7 is not used. Noise in the speech pattern is estimated during speaking pauses, and the temporally stationary noise sources are damped by means of spectral subtraction, where the autocorrelation of a clean speech signal is obtained by subtracting the autocorrelation of noise from that of corrupted speech. In the noise cancellation unit 198, if the energy of the current frame exceeds a reference threshold level, the user is presumed to be speaking to the computer and the autocorrelation of coefficients representing noise is not updated. However, if the energy of the current frame is below the reference threshold level, the effect of noise on the correlation coefficients is subtracted off in the spectral domain. The result is half-wave rectified with proper threshold setting and then converted to the desired autocorrelation coefficients.

The output of the autocorrelator 196 and the noise canceller 198 are presented to one or more parameterization units, including an LPC parameter unit 200, an FFT parameter unit 202, an auditory model parameter unit 204, a fractal parameter unit 206, or a wavelet parameter unit 208, among others. The parameterization units are connected to the parameter weighing unit 210, which is further connected to the temporal derivative unit 212 before it is presented to a vector quantizer 214.

The LPC analysis block 200 is one of the parameter blocks processed by the preferred embodiment. The LPC analysis converts each frame of p+1 autocorrelation values into an LPC parameter set as follows:

$$E^{(0)} = r(0)$$

$$k_i = \frac{r(i) - \sum_{j=1}^{L-1} \alpha_j^{(i-1)} r(|i-j|)}{E^{(i-1)}}$$

The final solution is given as:

$$\alpha_i^{(i)} = k_i$$

$$\alpha_j^{(i)} = \alpha_j^{(i-1)} - k_i \alpha_{i-j}^{(i-1)}$$

$$E^{(i)} = (1 - k_i^2) E^{(i-1)}$$

$a_m$=LPC coefficients=$\alpha_m^{(p)}$ $k_m$=PARCOR coefficients $$g_m = \log\left(\frac{1 - k_m}{1 + k_m}\right)$$

The LPC parameter is then converted into cepstral coefficients. The cepstral coefficients are the coefficients of the Fourier transform representation of the log magnitude spectrum. The cepstral coefficient c(m) is computed as follows:

$$c_o = \ln\sigma^2$$

$$c_m = a_m + \sum_{k=1}^{m-1}\left(\frac{k}{m}\right)c_k a_{m-k}$$

$$c_m = \sum_{k=1}^{m-1}\left(\frac{k}{m}\right)c_k a_{m-k}$$

where sigma represents the gain term in the LPC model.

Although the LPC analysis is used in the preferred embodiment, a filter bank spectral analysis, which uses the short-time Fourier transformer 202, may also be used alone or in conjunction with other parameter blocks. FFT is well known in the art of digital signal processing. Such a transform converts a time domain signal, measured as amplitude over time, into a frequency domain spectrum, which expresses the frequency content of the time domain signal as a number of different frequency bands. The FFT thus produces a vector of values corresponding to the energy amplitude in each of the frequency bands. The FFT converts the energy amplitude values into a logarithmic value which reduces subsequent computation since the logarithmic values are more simple to perform calculations on than the longer linear energy amplitude values produced by the FFT, while representing the same dynamic range. Ways for improving logarithmic conversions are well known in the art, one of the simplest being use of a look-up table.

In addition, the FFT modifies its output to simplify computations based on the amplitude of a given frame. This modification is made by deriving an average value of the logarithms of the amplitudes for all bands. This average value is then subtracted from each of a predetermined group of logarithms, representative of a predetermined group of frequencies. The predetermined group consists of the logarithmic values, representing each of the frequency bands. Thus, utterances are converted from acoustic data to a sequence of vectors of k dimensions, each sequence of vectors identified as an acoustic frame, each frame represents a portion of the utterance.

Alternatively, auditory modeling parameter unit 204 can be used alone or in conjunction with others to improve the parameterization of speech signals in noisy and reverberant environments. In this approach, the filtering section may be represented by a plurality of filters equally spaced on a log-frequency scale from 0 Hz to about 3000 Hz and having a prescribed response corresponding to the cochlea. The nerve fiber firing mechanism is simulated by a multilevel crossing detector at the output of each cochlear filter. The ensemble of the multilevel crossing intervals corresponding to the firing activity at the auditory nerve fiber-array. The interval between each successive pair of same direction, either positive or negative going, crossings of each predetermined sound intensity level is determined and a count of the inverse of these interspike intervals of the multilevel detectors for each spectral portion is stored as a function of frequency. The resulting histogram of the ensemble of inverse interspike intervals forms a spectral pattern that is representative of the spectral distribution of the auditory neural response to the input sound and is relatively insensitive to noise The use of a plurality of logarithmically related sound intensity levels accounts for the intensity of the input signal in a particular frequency range. Thus, a signal of a particular frequency having high intensity peaks results in a much larger count for that frequency than a low intensity signal of the same frequency. The multiple level histograms of the type described herein readily indicate the intensity levels of the nerve firing spectral distribution and cancel noise effects in the individual intensity level histograms.

Alternatively, the fractal parameter block 206 can further be used alone or in conjunction with others to represent spectral information. Fractals have the property of self similarity as the spatial scale is changed over many orders of magnitude. A fractal function includes both the basic form inherent in a shape and the statistical or random properties of the replacement of that shape in space. As is known in the art, a fractal generator employs mathematical operations known as local affine transformations. These transformations are employed in the process of encoding digital data representing spectral data. The encoded output constitutes a "fractal transform" of the spectral data and consists of coefficients of the affine transformations. Different fractal transforms correspond to different images or sounds. The fractal transforms are iteratively processed in the decoding operation. As disclosed in U.S. Pat. No. 5,347,600, issued on Sep. 13, 1994 to Barnsley, et al., one fractal generation method comprises the steps of storing the graphical data in the CPU; generating a plurality of uniquely addressable domain blocks from the stored spectral data, each of the domain blocks representing a different portion of information such that all of the stored image information is contained in at least one of the domain blocks, and at least two of the domain blocks being unequal in shape; and creating, from the stored image data, a plurality of uniquely addressable mapped range blocks corresponding to different subsets of the image data with each of the subsets having a unique address. The creating step included the substep of executing, for each of the mapped range blocks, a corresponding procedure upon the one of the subsets of the image data which corresponds to the mapped range block. The method further includes the steps of assigning unique identifiers to corresponding ones of the mapped range blocks, each of the identifiers specifying for the corresponding mapped range block an address of the corresponding subset of image data; selecting, for each of the domain blocks, the one of the mapped range blocks which most closely corresponds according to predetermined criteria; and representing the image information as a set of the identifiers of the selected mapped range blocks.

In U.S. Pat. No. 4,694,407, issued to Joan M. Ogden, another method for generating fractals using their self-similarity properties is disclosed. The self-similarity property of fractals are related to the self-similarity existing in inverse pyramid transforms. As discussed by P. J. Burt and E. H. Adelson in "A Multiresolution Spline with Application to Image Mosaics", ACM Transactions on Graphics, Vol. 2, No. 4, October 1983, pp. 217–236, the pyramid transform is a spectrum analysis model that separates a signal into a spatial-frequency band-pass components, each approximately an octave wide in one or more dimensions and a remnant low-pass component. The band-pass components have successively lower center frequencies and successively less dense sampling in each dimension, each being halved from one band-pass component to the next lower. The remnant low-pass component may be sampled with the same density as the lowest band-pass component or may be sampled half so densely in each dimension. Processes that operate on the transform result components affect, on different scales, the reconstruction of signals in an inverse transform process. Processes operating on the lower spatial frequency, more sparsely sampled transform result components affect the reconstructed signal over a larger region than do processes operating on the higher spatial frequency, more densely sampled transform result components. The more sparsely sampled transform result components are next expanded through interpolation to be sampled at the same density as the most densely sampled transform result. The expanded transform result components, now sampled at similar sampling density, are linearly combined by a simple matrix summation which adds the expanded transform result components at each corresponding sample location in the shared most densely sampled sample space to generate the fractal. The pyramidal transformation resembles that of a wavelet parameterization.

Alternatively, a wavelet parameterization block 208 can be used alone or in conjunction with others to generate the parameters. Like the FFT, the discrete wavelet transform (DWT) can be viewed as a rotation in function space, from the input space, or time domain, to a different domain. The DWT consists of applying a wavelet coefficient matrix hierarchically, first to the full data vector of length N, then to a smooth vector of length N/2, then to the smooth-smooth vector of length N/4, and so on. Most of the usefulness of wavelets rests on the fact that wavelet transforms can usefully be severely truncated, that is, turned into sparse expansions. In the DWT parameterization block, the wavelet transform of the speech signal is performed. The wavelet coefficients is allocated in a nonuniform, optimized manner. In general, large wavelet coefficients are quantized accurately, while small coefficients are quantized coarsely or even truncated completely to achieve the parameterization.

Due to the sensitivity of the low-order cepstral coefficients to the overall spectral slope and the sensitivity of the high-order cepstral coefficients to noise variations, the parameters generated by block 208 may be weighted by a parameter weighing block 210, which is a tapered window, so as to minimize these sensitivities.

Next, a temporal derivator 212 measures the dynamic changes in the spectra. The regression coefficient, essentially a slope measurement, is defined as:

$$R_m(t) = \frac{\sum_{n=-\delta}^{\delta} nC_m(t+n)}{\sum_{n=-\delta}^{\delta} n^2}$$

where R is the regression coefficient and Cm(t) is the m-th coefficient of the t-th frame of the utterance. Next, a differenced LPC cepstrum coefficient set is computed by:

$$D_m(t) = C_m(t+\delta) - C_m(t-\delta)$$

where the differenced coefficient is computed for every frame, with delta set to two frames.

Power features are also generated to enable the system to distinguish speech from silence. Power can simply computed from the waveform as:

$$P = \log\left(\sum_{i=1}^{N} x_i^2\right)$$

where P is the power for frame n, which has M discrete time samples that has been Hamming windowed. Next, a differenced power set is computed by:

$$DP_m(t) = P_m(t+\delta) - P_m(t-\delta)$$

where the differenced coefficient is computed for every frame, with delta set to two frames.

After the feature extraction has been performed, the speech parameters are next assembled into a multidimensional vector and a large collection of such feature signal vectors can be used to generate a much smaller set of vector quantized (VQ) feature signals by a vector quantizer 214 that cover the range of the larger collection. In addition to reducing the storage space, the VQ representation simplifies the computation for determining the similarity of spectral analysis vectors and reduces the similarity computation to a look-up table of similarities between pairs of codebook vectors. To reduce the quantization error and to increase the dynamic range and the precision of the vector quantizer, the preferred embodiment partitions the feature parameters into separate codebooks, preferably three. In the preferred embodiment, the first, second and third codebooks correspond to the cepstral coefficients, the differenced cepstral coefficients, and the differenced power coefficients. The construction of one codebook, which is representative of the others, is described next.

Figure 18:
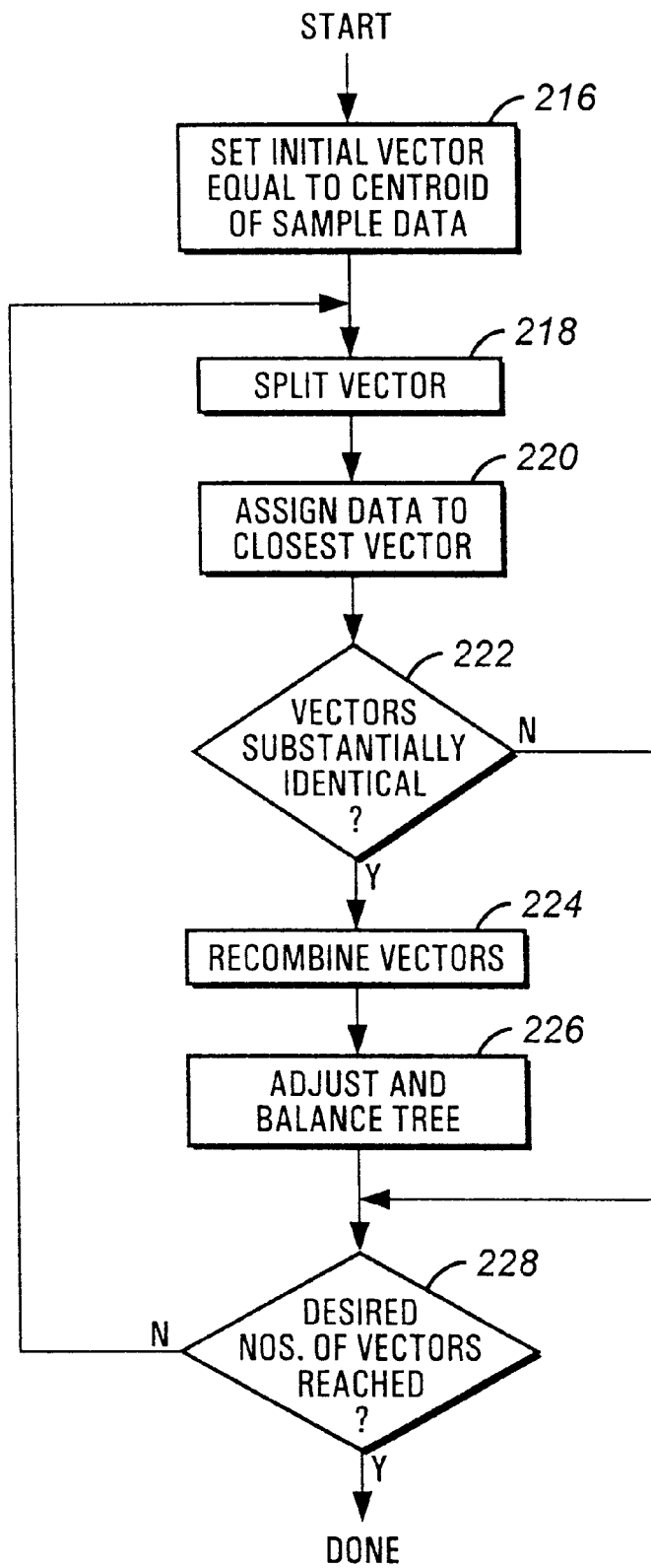
FIG. 18 is an expanded diagram of a vector quantizer in the feature extractor speech recognizer of FIG. 16.

The preferred embodiment uses a binary split codebook approach shown in FIG. 18 to generate the codewords in each codebook. In the preferred embodiment, an M-vector codebook is generated in stages, first with a 1-vector codebook and then splitting the codewords into a 2-vector codebook and continuing the process until an M-vector codebook is obtained, where M is preferably 256.

The codebook is derived from a set of training vectors X[q] obtained initially from a range of speakers who read one or more times a predetermined text with a high coverage of all phonemes into the microphone for training purposes. As shown in step 216 of FIG. 18, the vector centroid of the entire set of training vectors is computed by:

$$\vec{W}[c] = \frac{1}{Q}\sum_{q=1}^{Q} \vec{X}[q]$$

In step 218, the codebook size is doubled by splitting each current codebook to form a tree as:

$$\vec{W}_n^+ = \vec{W}_n(1+\epsilon)$$
$$\vec{W}_n^- = \vec{W}_n(1-\epsilon)$$

where n varies from 1 to the current size of the codebook and epsilon is a relatively small valued splitting parameter.

In step 220, the data groups are classified and assigned to the closest vector using the K-means iterative technique to get the best set of centroids for the split codebook. For each training word, a training vector is assigned to a cell corresponding to the codeword in the current codebook, as measured in terms of spectral distance. In step 220, the codewords are updated using the centroid of the training vectors assigned to the cell as follows:

$$\vec{W}[A] = \vec{W}[A] + \eta(\vec{X}[q] - \vec{W}[A]), 0 \le \eta \le 1$$

The distortion is computed by summing the distances of all training vectors in the nearest-neighbor search so as to determine whether the procedure has converged:

$$d_{iq} = \frac{1}{N} \sum_{n=1}^{N} (w_{ni} - x_{nq})^2$$

wherein w and x represent scalar elements of a vector.

In step 222, the split vectors in each branch of the tree is compared to each other to see if they are very similar, as measured by a threshold. If the difference is lower than the threshold, the split vectors are recombined in step 224. To maintain the tree balance, the most crowded node in the opposite branch is split into two groups, one of which is redistributed to take the space made available from the recombination of step 224. Step 226 further performs node readjustments to ensure that the tree is properly pruned and balanced. In step 228, if the desired number of vectors has been reach, the process ends; otherwise, the vectors are split once more in step 218.

The resultant set of codewords form a well-distributed codebook. During look up using the codebook, an input vector may be mapped to the nearest codeword in one embodiment using the formula:

$$d = \frac{1}{N} \sum_{n=1}^{N} (W[a]_n - W[b]_n)^2$$

Generally, the quantization distortion can be reduced by using a large codebook. However, a very large codebook is not practical because of search complexity and memory limitations. To keep the codebook size reasonable while maintaining the robustness of the codebook, fuzzy logic can be used in another embodiment of the vector quantizer.

With conventional vector quantization, an input vector is represented by the codeword closest to the input vector in terms of distortion. In conventional set theory, an object either belongs to or does not belong to a set. This is in contrast to fuzzy sets where the membership of an object to a set is not so clearly defined so that the object can be a part member of a set. Data are assigned to fuzzy sets based upon the degree of membership therein, which ranges from 0 (no membership) to 1.0 (full membership). A fuzzy set theory uses membership functions to determine the fuzzy set or sets to which a particular data value belongs and its degree of membership therein.

The fuzzy vector quantization represents the input vector using the fuzzy relations between the input vector and every codeword as follows:

$$x'_k = \frac{\sum_{i=1}^{c} [u_{ik}^m v_i]}{\sum_{i=1}^{c} u_{ik}^m}$$

where $x'_k$ is a fuzzy VQ representation of input vector $x_k$, and $v_i$ is a codeword, c is the number of codewords, m is a constant, and $$u_{ik} = \frac{1}{\sum_{j=1}^{c} \left(\frac{d_{ik}}{d_{jk}}\right)^{\frac{1}{m-1}}}$$

where $d_{ik}$ is the distance of the input vector $x_k$ and the codeword $v_i$.

To handle the variance of speech patterns of individuals over time and to perform speaker adaptation in an automatic, self-organizing manner, an adaptive clustering technique called hierarchical spectral clustering is used. Such speaker changes can result from temporary or permanent changes in vocal tract characteristics or from environmental effects. Thus, the codebook performance is improved by collecting speech patterns over a long period of time to account for natural variations in speaker behavior. The adaptive clustering system is defined as:

$$\vec{W}[A] = \vec{W}[A] + \frac{(\vec{X}' - \vec{W}[A])}{2}$$

where the vector X' is the speech vector closest in spectral distance to W[A] after training.

Figure 19:
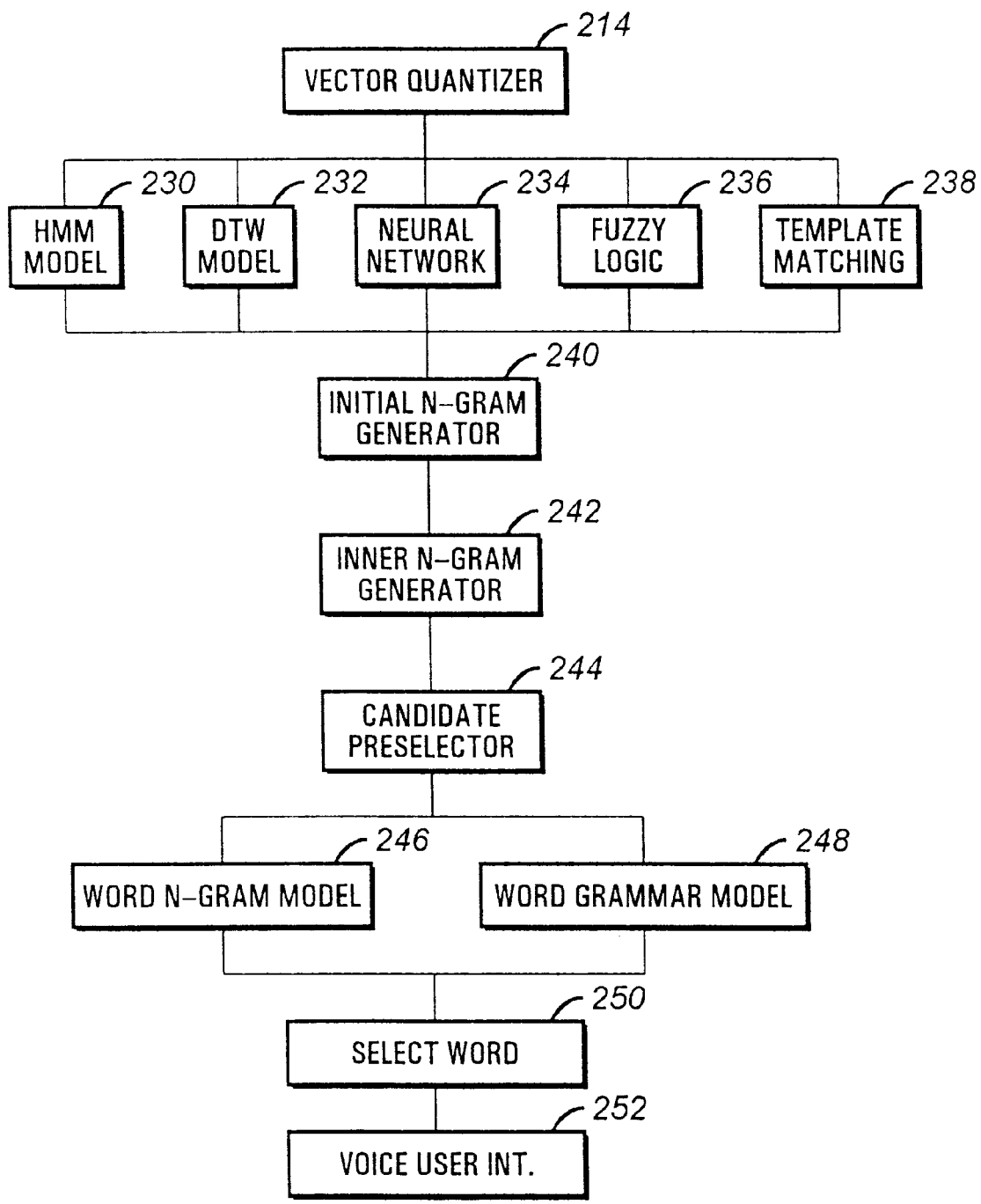
FIG. 19 is an expanded diagram of a word preselector of the speech recognizer of FIG. 16.

In the preferred embodiment, a neural network is used to recognize each codeword in the codebook as the neural network is quite robust at recognizing codeword patterns. Once the speech features have been characterized, the speech recognizer then compares the input speech with the stored templates of the vocabulary known by the speech recognizer. Turning now to FIG. 19, the conversion of VQ symbols into one or more words is disclosed. A number of speaking modes may be encountered, including isolated word recognition, connected word recognition and continuous speech recognition. The recognition of isolated words from a given vocabulary for a known speaker is well known. In isolated word recognition, words of the vocabulary are prestored as individual templates, each template representing the sound pattern of a word in the vocabulary. When an isolated word is spoken, the system compares the word to each individual template representing the vocabulary and if the pronunciation of the word matches the template, the word is identified for further processing. However, a simple template comparison of the spoken word to a pre-stored model is insufficient, as there is an inherent variability to human speech which must be considered in a speech recognition system.

As shown in FIG. 19, data from the vector quantizer 214 is presented to one or more recognition models, including an HMM model 230, a dynamic time warping model 232, a neural network 234 a fuzzy logic 236, or a template matcher 238, among others. These models may be used singly or in combination. The output from the models is presented to an initial N-gram generator 240 which groups N-number of outputs together and generates a plurality of confusingly similar candidates as initial N-gram prospects. Next, an inner N-gram generator 242 generates one or more N-grams from the next group of outputs and appends the inner trigrams to the outputs generated from the initial N-gram generator 240. The combined N-grams are indexed into a dictionary to determine the most likely candidates using a candidate preselector 244. The output from the candidate preselector 244 is presented to a word N-gram model 246 or a word grammar model 248, among others to select the most likely word in box 250. The word selected is either accepted or rejected by a voice user interface (VUI) 252.

Figure 20:
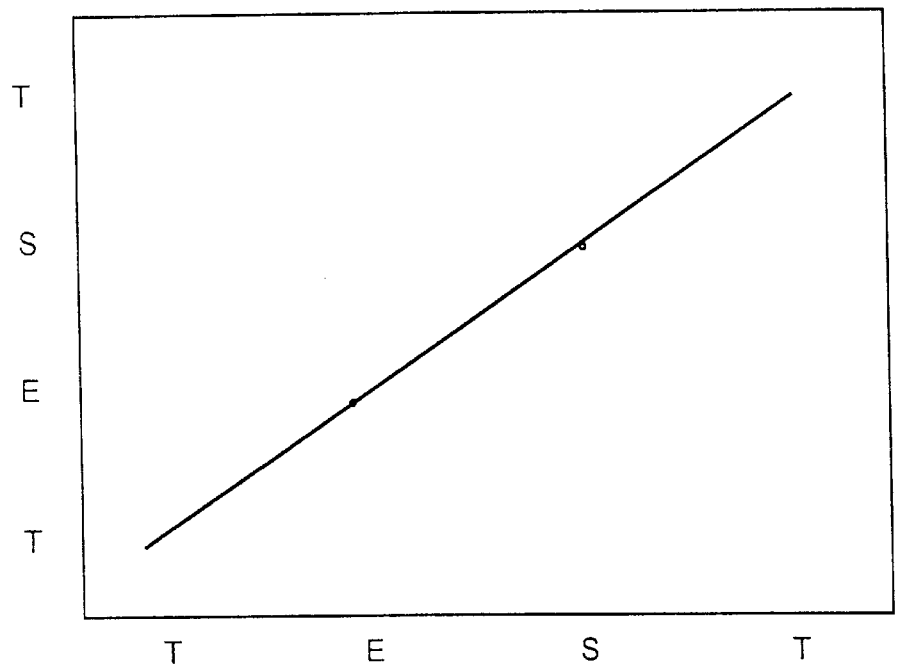
FIGS. 20 and 21 are diagrams showing the matching operation performed by the dynamic programming block of the word preselector of the speech recognizer of FIG. 19.
Figure 21:
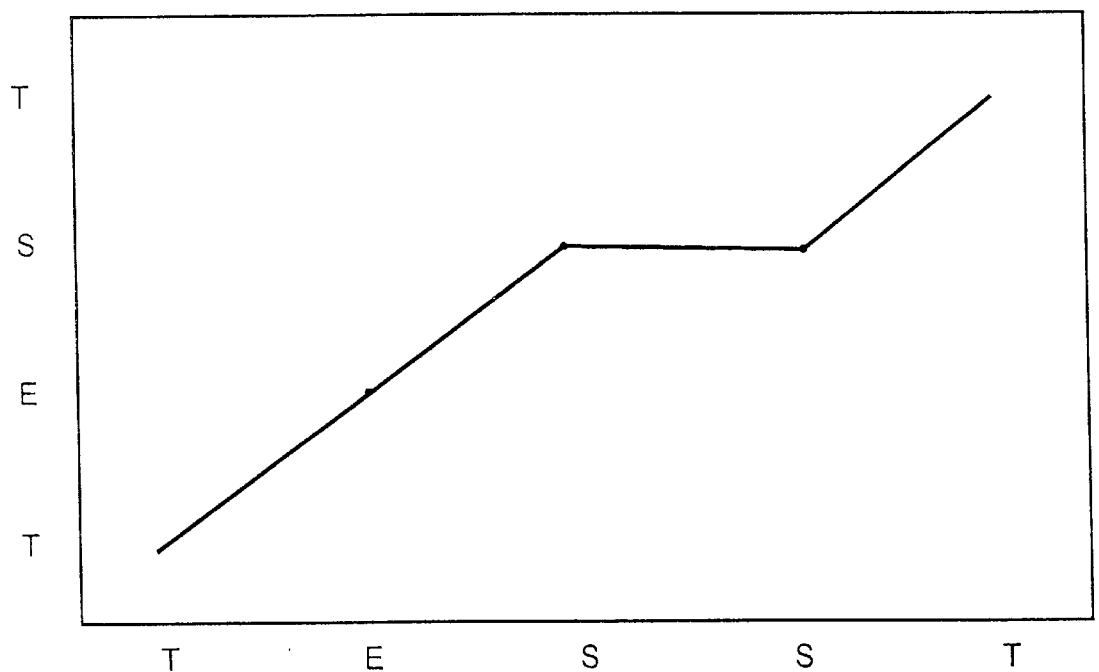

The string of phonemes representative of continuous speech needs to be identified before they can be decoded into discrete words. One embodiment of the present invention applies dynamic programming to the recognition of isolated or connected speech in the DTW model 232. FIGS. 20 and 21 show, for illustrative purposes, the matching of the dictionary word "TEST" with the input "TEST" and "TESST". As shown in FIGS. 20 and 21, the effect of dynamic processing, at the time of recognition, is to slide, or expand and contract, an operating region, or window, relative to the frames of speech so as to align those frames with the node models of each vocabulary word to find a relatively optimal time alignment between those frames and those nodes. The dynamic processing in effect calculates the probability that a given sequence of frames matches a given word model as a function of how well each such frame matches the node model with which it has been time-aligned. The word model which has the highest probability score is selected as corresponding to the speech.

Dynamic programming obtains a relatively optimal time alignment between the speech to be recognized and the nodes of each word model, which compensates for the unavoidable differences in speaking rates which occur in different utterances of the same word. In addition, since dynamic programming scores words as a function of the fit between word models and the speech over many frames, it usually gives the correct word the best score, even if the word has been slightly misspoken or obscured by background sound. This is important, because humans often mispronounce words either by deleting or mispronouncing proper sounds, or by inserting sounds which do not belong.

In dynamic time warping, the input speech A, defined as the sampled time values A=a(1) ... a(n), and the vocabulary candidate B, defined as the sampled time values B=b(1) ... b(n), are matched up to minimize the discrepancy in each matched pair of samples. Computing the warping function can be viewed as the process of finding the minimum cost path from the beginning to the end of the words, where the cost is a function of the discrepancy between the corresponding points of the two words to be compared.

The warping function can be defined to be:

C=c(1), c(2), ..., c(k), ... c(K)

where each c is a pair of pointers to the samples being matched:

c(k)=[i(k), j(k)]

In this case, values for A are mapped into i, while B values are mapped into j. For each c(k), a cost function is computed between the paired samples. The cost function is defined to be:

$d[c(k)]=(a_{j(k)}-b_{j(k)})^2$

The warping function minimizes the overall cost function:

$$D(C) = \sum_{k=1}^{K} d[c(k)]$$

subject to the constraints that the function must be monotonic $i(k) \geq i(k-1)$ and $j(k) \geq j(k-1)$ and that the endpoints of A and B must be aligned with each other, and that the function must not skip any points.

Dynamic programming considers all possible points within the permitted domain for each value of i. Because the best path from the current point to the next point is independent of what happens beyond that point. Thus, the total cost of [i(k), j(k)] is the cost of the point itself plus the cost of the minimum path to it. Preferably, the values of the predecessors can be kept in an M×N array, and the accumulated cost kept in a 2×N array to contain the accumulated costs of the immediately preceding column and the current column. However, this method requires significant computing resources.

In Sakoe's "Two level DP Matching—A dynamic programming based pattern matching algorithm for connected word recognition", IEEE Trans. Acoustics, Speech and Signal Processing, Vol. ASSP-27, No. 6, pp. 588–595, December 1979, the method of whole-word template matching has been extended to deal with connected word recognition. The paper suggests a two-pass dynamic programming algorithm to find a sequence of word templates which best matches the whole input pattern. In the first pass, a score is generated which indicates the similarity between every template matched against every possible portion of the input pattern. In the second pass, the score is used to find the best sequence of templates corresponding to the whole input pattern.

Dynamic programming requires a tremendous amount of computation. For the speech recognizer to find the optimal time alignment between a sequence of frames and a sequence of node models, it must compare most frames against a plurality of node models. One method of reducing the amount of computation required for dynamic programming is to use pruning. Pruning terminates the dynamic programming of a given portion of speech against a given word model if the partial probability score for that comparison drops below a given threshold. This greatly reduces computation, since the dynamic programming of a given portion of speech against most words produces poor dynamic programming scores rather quickly, enabling most words to be pruned after only a small percent of their comparison has been performed.

To reduce the computations involved, one embodiment limits the search to that within a legal path of the warping. Typically, the band where the legal warp path must lie is usually defined as $|i-j| \leq r$, where r is a constant representing the vertical window width on the line defined by A & B. To minimize the points to be computed, the DTW limits its computation to a narrow band of legal path to:

$$\left| i - \frac{j}{S} \right| \leq \frac{L_t}{2} \left( \sqrt{1+S^2} \right)$$

where L(t) is the length of the perpendicular vector connecting L(A) with j=S(i)+r and L(B) with j=S(i)-r, and S=slope as defined by A/B.

Considered to be a generalization of dynamic programming, a hidden Markov model is used in the preferred embodiment to evaluate the probability of occurrence of a sequence of observations O(1), O(2), ... O(t), ..., O(T), where each observation O(t) may be either a discrete symbol under the VQ approach or a continuous vector. The sequence of observations may be modeled as a probabilistic function of an underlying Markov chain having state transitions that are not directly observable.

In the preferred embodiment, the Markov network is used to model approximately 50 phonemes and approximately 50 confusing and often slurred function words in the English language. While function words are spoken clearly in isolated-word speech, these function words are often articulated extremely poorly in continuous speech. The use of function word dependent phones improves the modeling of specific words which are most often distorted. These words include, "a", "an", "be", "was", "will", "would," among others.

Figure 22:
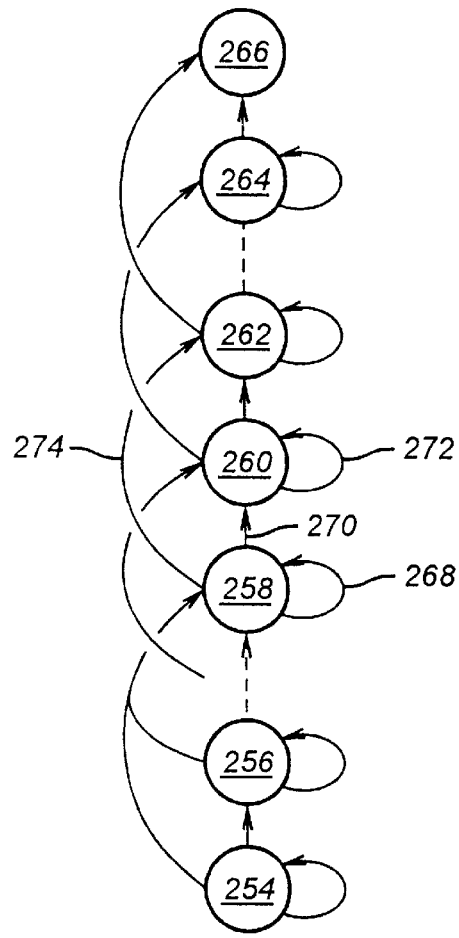
FIG. 22 is a diagram of a HMM of the word preselector of the speech recognizer of FIG. 19.

FIG. 22 illustrates the hidden Markov model used in the preferred embodiment. Referring to FIG. 22, there are N states 254, 256, 258, 260, 262, 264 and 266. The transitions between states are represented by a transition matrix A=[a (i,j)]. Each a(i,j) term of the transition matrix is the probability of making a transition to state j given that the model is in state i. The output symbol probability of the model is represented by a set of functions B=[b(j)(O(t)], where the b(j)(O(t) term of the output symbol matrix is the probability of outputting observation O(t), given that the model is in state j. The first state is always constrained to be the initial state for the first time frame of the utterance, as only a prescribed set of left-to-right state transitions are possible. A predetermined final state is defined from which transitions to other states cannot occur. These restrictions are shown in the model state diagram of FIG. 22 in which state 254 is the initial state, state 266 is the final or absorbing state, and the prescribed left-to-right transitions are indicated by the directional lines connecting the states.

Referring to FIG. 22, transitions from the exemplary state 258 is shown. From state 258 in FIG. 22, it is only possible to reenter state 258 via path 268, to proceed to state 260 via path 270, or to proceed to state 262 via path 274.

Transitions are restricted to reentry of a state or entry to one of the next two states. Such transitions are defined in the model as transition probabilities. For example, a speech pattern currently having a frame of feature signals in state 2 has a probability of reentering state 2 of a(2,2), a probability a(2,3) of entering state 3 and a probability of a(2,4)=1−a(2,1)−a(2,2) of entering state 4. The probability a(2, 1) of entering state 1 or the probability a(2,5) of entering state 5 is zero and the sum of the probabilities a(2,1) through a(2,5) is one. Although the preferred embodiment restricts the flow graphs to the present state or to the next two states, one skilled in the art can build an HMM model without any transition restrictions, although the sum of all the probabilities of transitioning from any state must still add up to one.

In each state of the model, the current feature frame may be identified with one of a set of predefined output symbols or may be labeled probabilistically. In this case, the output symbol probability b(j) O(t) corresponds to the probability assigned by the model that the feature frame symbol is O(t). The model arrangement is a matrix A=[a(i,j)] of transition probabilities and a technique of computing B=b(j) O(t), th feature frame symbol probability in state j.

The probability density of the feature vector series Y=y (1), . . . , y(T) given the state series X=x(1), . . . , x(T) is

[Precise solution]

$$L_1(v) = \sum_x P(Y, X|\lambda^v)$$

[Approximate solution]

$$L_2(v) = \max_x [P(Y, X|\lambda^v)]$$

[Log approximate solution]

$$L_3(v) = \max_x [\log P(Y, X|\lambda^v)]$$

The final recognition result v of the input voice signal x is given by:

$$v = \operatorname*{argmax}_v [L_n(v)]$$

where n is a positive integer.

Figure 23:
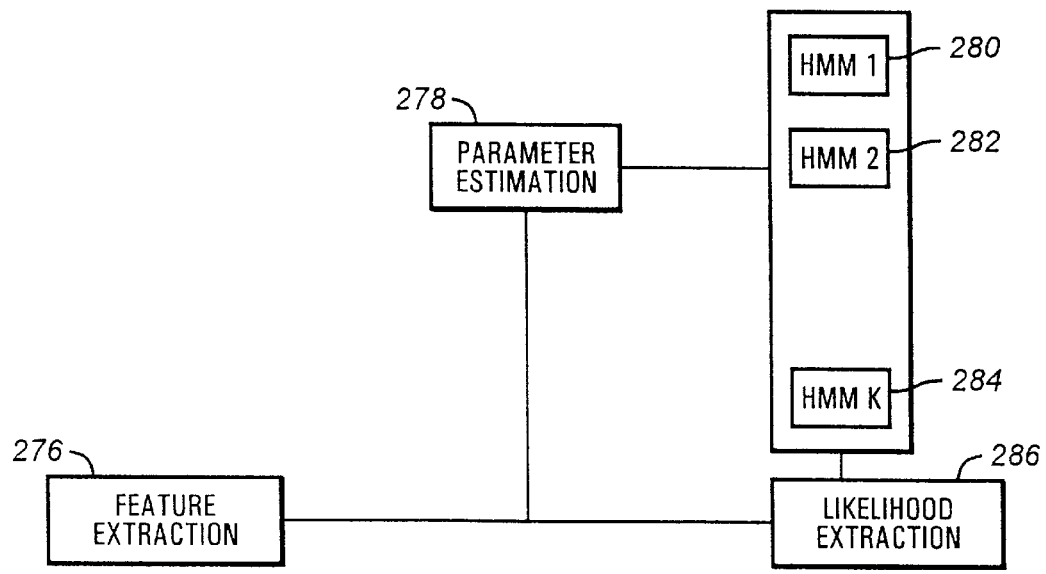
FIG. 23 is a diagram showing the relationship of the parameter estimation block and likelihood evaluation block with respect to a plurality of HMM templates of FIG. 22.

The Markov model is formed for a reference pattern from a plurality of sequences of training patterns and the output symbol probabilities are multivariate Gaussian function probability densities. As shown in FIG. 23, the voice signal traverses through the feature extractor 276. During learning, the resulting feature vector series is processed by a parameter estimator 278, whose output is provided to the hidden Markov model. The hidden Markov model is used to derive a set of reference pattern templates 280–284, each template 280 representative of an identified pattern in a vocabulary set of reference phoneme patterns. The Markov model reference templates 280–284 are next utilized to classify a sequence of observations into one of the reference patterns based on the probability of generating the observations from each Markov model reference pattern template. During recognition, the unknown pattern can then be identified as the reference pattern with the highest probability in the likelihood calculator 286.

Figure 24:
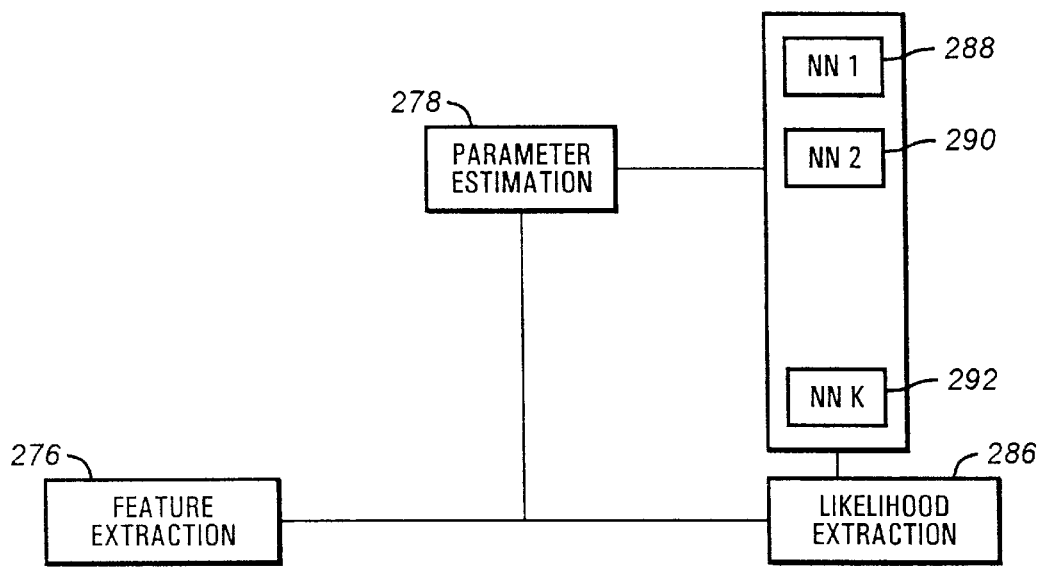
FIG. 24 is a diagram showing the relationship of the parameter estimation block and likelihood evaluation block with respect to a plurality of neural network templates of FIG. 23.

FIG. 24 shows the recognizer with neural network templates 288–292. As shown in FIG. 24, the voice signal traverses through the feature extractor 276. During learning, the resulting feature vector series is processed by a parameter estimator 278, whose output is provided to the neural network. The neural network is stored in a set of reference pattern templates 288–292,each of templates 288–292 being representative of an identified pattern in a vocabulary set of reference phoneme patterns. The neural network reference templates 288–292 are then utilized to classify a sequence of observations as one of the reference patterns based on the probability of generating the observations from each neural network reference pattern template. During recognition, the unknown pattern can then be identified as the reference pattern with the highest probability in the likelihood calculator 286.

Figure 25:
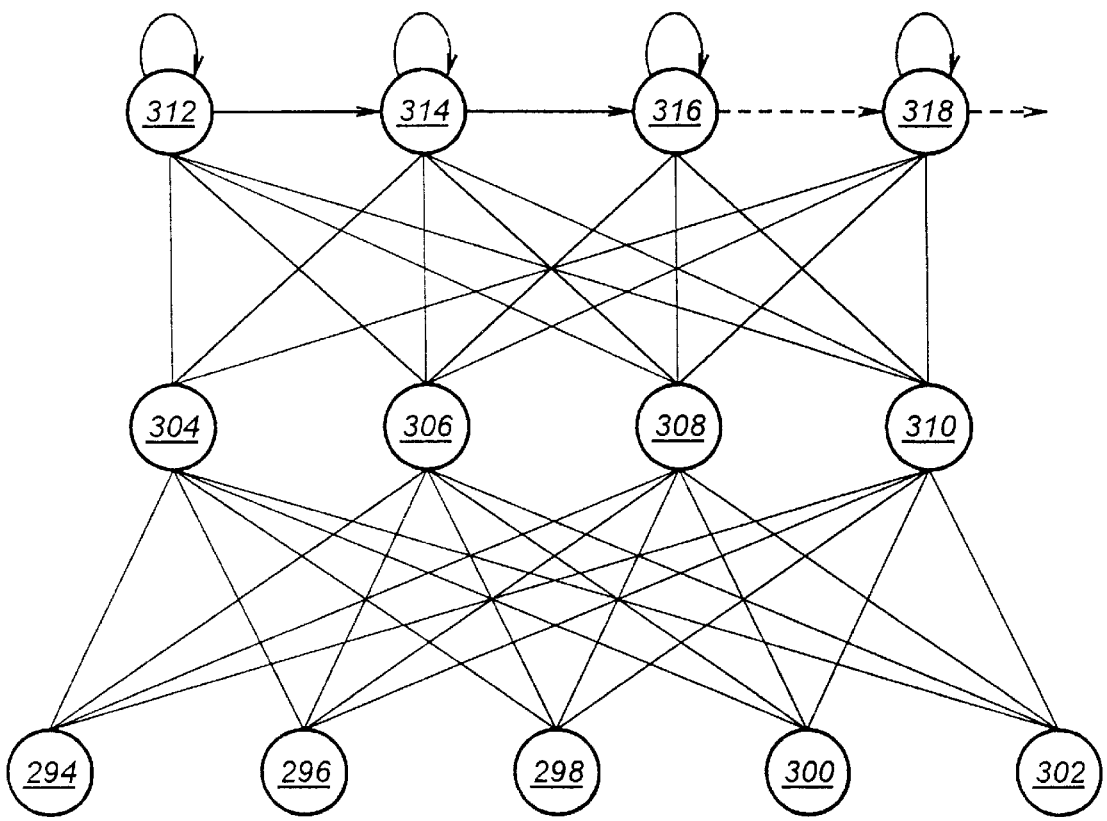
FIG. 25 is a diagram of a neural network front-end in combination with the HMM in accordance to another aspect of the invention.

In FIG. 23, the HMM template 280 has a number of states, each having a discrete value. However, because speech features may have a dynamic pattern in contrast to a single value. The addition of a neural network at the front end of the HMM in an embodiment provides the capability of representing states with dynamic values. In FIG. 25, the input layer of the neural network comprises input neurons 294–302. The outputs of the input layer are distributed to all neurons 304–310 in the middle layer. Similarly, the outputs of the middle layer are distributed to all output states 312–318, which normally would be the output layer of the neuron. However, in FIG. 25, each output has transition probabilities to itself or to the next outputs, thus forming a modified HMM. Each state of the thus formed HMM is capable of responding to a particular dynamic signal, resulting in a more robust HMM. Alternatively, the neural network can be used alone without resorting to the transition probabilities of the HMM architecture. The configuration shown in FIG. 25 can be used in place of the template element 280 of FIG. 23 or element 288 of FIG. 24.

Turning back to FIG. 16, the subwords detected by the subword recognizer 182 of FIG. 16 are provided to a word preselector 186. In a continuous speech recognizer, the discrete words need to be identified from the stream of phonemes. One approach to recognizing discrete words in continuous speech is to treat each successive phonemes of the speech as the possible beginning of a new word, and to begin dynamic programming at each such phoneme against the start of each vocabulary word. However, this approach requires a tremendous amount of computation. A more efficient method used in the prior art begins dynamic programming against new words only at those frames for which the dynamic programming indicates that the speaking of a previous word has just ended. Although this latter method provides a considerable improvement over the brute force matching of the prior art, there remains a need to further reduce computation by reducing the number of words against which dynamic programming is to be applied.

One such method of reducing the number of vocabulary words against which dynamic programming is applied in continuous speech recognition associates a phonetic label with each frame of the speech to be recognized. Speech is divided into segments of successive phonemes associated with a single word. For each given segment, the system takes the sequence of trigrams associated with that segment plus a plurality of consecutive sequence of trigrams, and refers to a look-up table to find the set of vocabulary words which previously have been determined to have a reasonable probability of starting with that sequence of phoneme labels. The thus described wordstart cluster system limits the words against which dynamic programming could start in the given segment to words in that cluster or set.

The word-start cluster method is performed by a word preselector 186, which is essentially a phoneme string matcher where the strings provided to it may be corrupted as a result of misreading, omitting or inserting phonemes. The errors are generally independent of the phoneme position within the string. The phoneme sequence can be corrected by comparing the misread string to a series of valid phoneme strings stored in a lexicon and computing a holographic distance to compare the proximity of each lexicon phoneme string to the speech phoneme string.

Holographic distance may be computed using a variety of techniques, but preferably, the holographic distance measurements shares the following characteristics: (1) two copies of the same string exhibit a distance of zero; (2) distance is greatest between strings that have few phonemes in common, or that have similar phonemes in very different order; (3) deletion, insertion or substitution of a single phoneme causes only a small increase in distance; and (4) the position of a nonmatching phoneme within the string has little or no effect on the distance.

Figure 26:
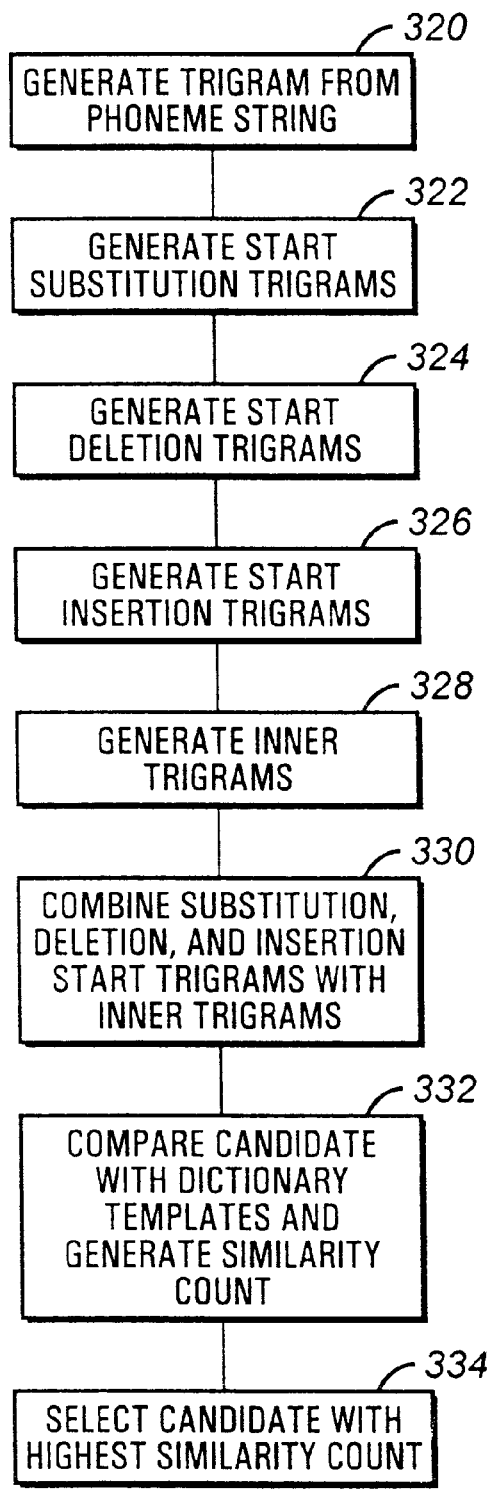
FIG. 26 is a block diagram of a word preselector of the speech recognizer of FIG. 16.

As shown in FIG. 26, the holographic distance metric uses an N-gram hashing technique, where a set of N adjacent letters are bundled into a string is called an N-gram. Common values for N are 2 or 3, leading to bigram or trigram hashing, respectively. In the preferred embodiment, a start trigram and a plurality of inner trigrams are extracted from the speech string in box 320, which may have corrupted phonemes. In box 322, the start trigrams are generated by selecting the first three phonemes. After the original start trigram has been picked, extended trigrams are generated using the phoneme recognition error probabilities in the confusion matrix covering confusingly similar trigrams. For substitution errors, several phonemes with high substitution probabilities are selected in addition to the original phonemes in the trigram in box 322. Similarly, extended start trigrams are generated for phoneme omission and insertion possibilities in boxes 324–326.

Once extended start trigrams have been generated, a plurality of inner trigrams is generated by advancing, or sliding, a window across the speech string one phoneme at a time in step 328. The combined extended start trigrams and the inner trigrams are combined into a plurality of trigram candidates in step 330. A substring search for the occurrences of the generated inner trigram is then performed on the candidates in box 332, with the count of the matching inner trigrams being summed up as the measure of similarity. In addition to the matching of strings, the measure of similarity also rewards the similarities in the location of the trigrams. Thus, similar trigrams occupying similar slots in the strings are awarded more points. Summing the absolute values of the differences for all trigrams results in a Manhattan distance measurement between the strings. Alternatively, the count differences can be squared before summing, to yield a squared Euclidean distance measurement. The entry with the largest count is picked as the preselected word.

Figure 27:
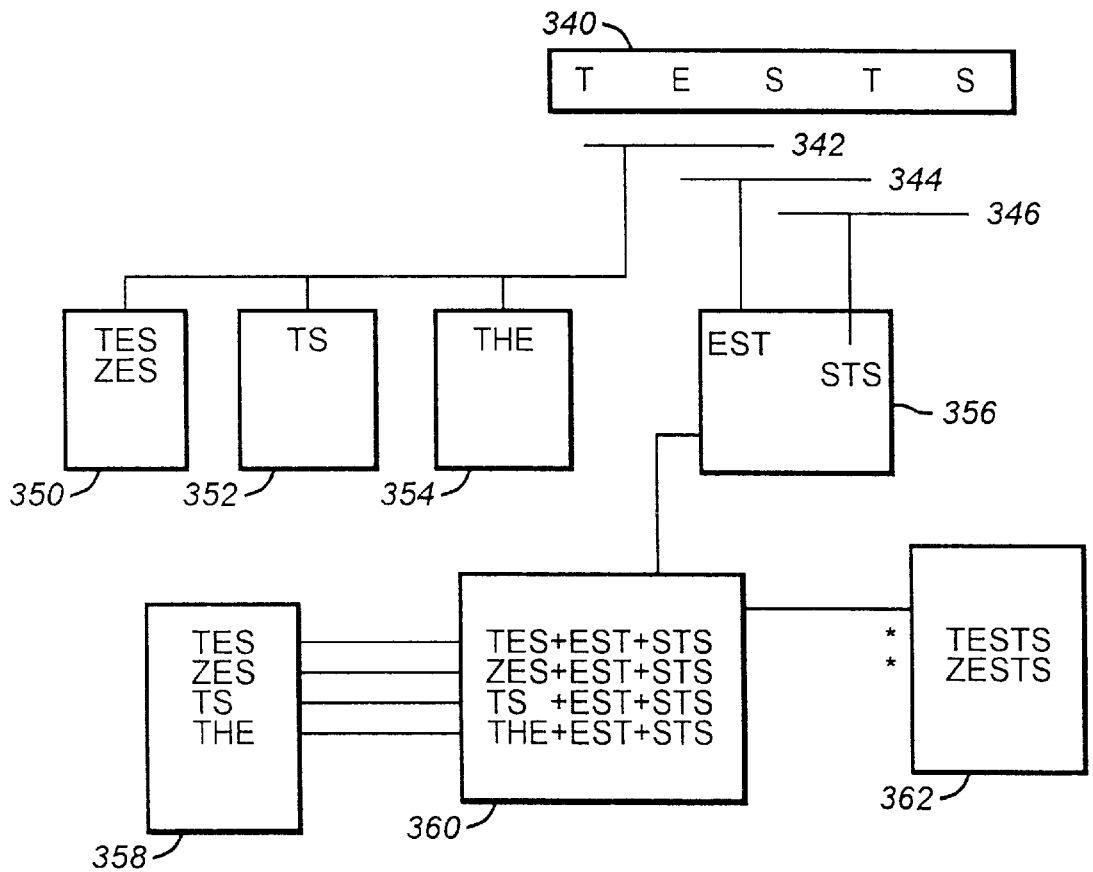
FIG. 27 is another block diagram illustrating the operation of the word preselector of FIG. 26.

FIG. 27 shows another view of the candidate pre-selection operation. In box 340, the representative sample word is "TESTS." As shown in box 350, the trigram is "TES". Further, the "TES" trigram is, for illustrative purpose, confusingly similar to "ZES", among others. In box 352, the deletion of the "E" leaves the trigram "TS", among others. Similar, in box 354, the insertion of the "H" generates the trigram "THE", among others. In box 356, an inner trigram "EST" is generated by the grouping 344, while another inner trigram "STS" is generated by the grouping 346. In step 358, the initial trigrams are collected together, ready for merging with the inner trigrams in box 356. In step 360, the initial trigrams and the inner trigrams are combined and indexed into the dictionary 362 using the holographic trigram matching counts disclosed above. In box 362, the candidates TESTS and ZESTS are selected as the most likely candidates based on the matching counts. In this manner, possible candidates to be recognized are generated to cover the possibilities that one or more subwords, or phonemes, may not have been properly recognized.

Once the word candidates have been preselected, the preselected words are presented to a syntax checker 188 of FIG. 16 which tests the grammatical consistency of preselected words in relationship with previous words. If the syntax checker 188 accepts the preselected word as being syntactically consistent, the preselected word is provided to the user via the user interface. The syntax checker 188 partially overcomes the subword preselector's inability to uniquely determine the correct word. For instance, the word preselector may have a difficult time determining whether the speech segment was "one-two-three" or "won-too-tree." Similarly, the system may have a hard time distinguishing "merry" from "very" or "pan" from "ban." Yet, the context, in the form of syntax, often overcomes confusingly similar homonyms.

In one embodiment, the preselected words are scored using N-gram models, which are statistical models of the language based on prior usage history. In the event of a bigram system, the bigram models are created by consulting the usage history to find the occurrences of the word and the pair of words. The use of bigram models reduces the perplexity, or the average word branching factor of the language model. In a 1,000 word vocabulary system with no grammar restriction, the perplexity is about 1,000 since any word may follow any other word. The use of bigram models reduces the perplexity of a 1,000 word vocabulary system to about 60.

In another embodiment, a syntax analyzer is utilized to eliminate from consideration semantically meaningless sentences. The analysis of a language is typically divided into four parts: morphology (word structure), syntax (sentence structure), semantics (sentence meaning) and pragmatics (relationship between sentences). Thus, English words are assigned to one more more part-of-speech categories having similar syntactic properties such as nouns, verbs, adjectives, and adverbs, among others.

In the embodiment implementing an appointment calendar portion of a PIM, a grammar/syntax unit is used to perform conventional syntax restrictions on the stored vocabulary with which the speech is compared, according to the syntax of previously identified words. The word candidates are also scored based on each word's part-of-speech via a grammar analyzer which processes the words to determine a higher grammatical structure and to detect mismatches.

Figure 28:
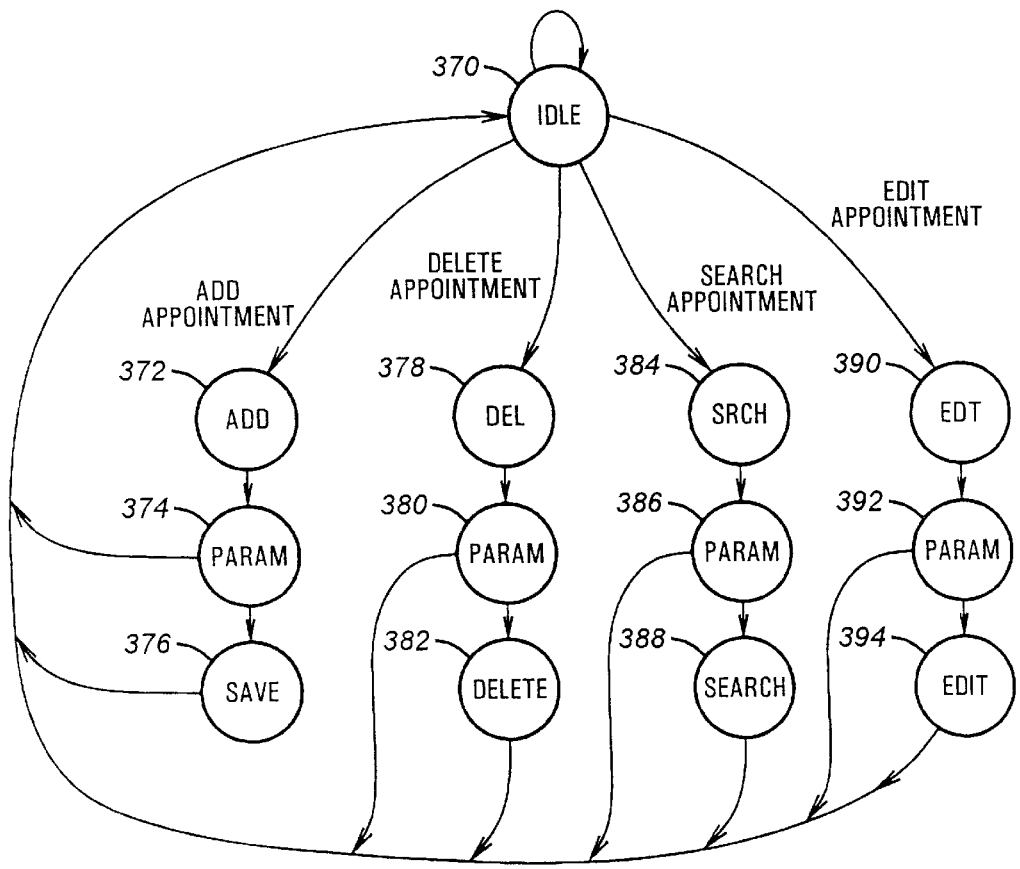
FIG. 28 is a state machine for a grammar in accordance with another aspect of the present invention.

In the preferred embodiment, the syntax checker comprises a state machine specifying the allowable state transitions for a personal information manager (PIM), specifically an appointment calendar. As shown in FIG. 28, the state machine is initialized in IDLE state 370. If the user utters "Add Appointment", the state machine transitions to a state ADD 372. If the user utters "Delete Appointment", the state machine transitions to a state DEL 378. If the user utters "Search Appointment", the state machine transitions to a state SRCH 384. If the user utters "Edit Appointment", the state machine transitions to a state EDT 390.

Once in states ADD 372, DEL 378, SRCH 384 and EDT 390, the state machine transitions to states PARAM 374, 380, 386 and 392, which are adapted to receive parameters for each ADD, DEL, SRCH and EDT operation. Once the parameters have been obtained, the state machine transitions to the SAVE state 376 to save the parameters into the appointment, the DELETE state 382 to remove the appointments having the same parameters, the SEARCH state 388 to display the results of the search for records with matching parameters, and the EDIT state 394 to alter records that match with the parameters.

Figure 29:
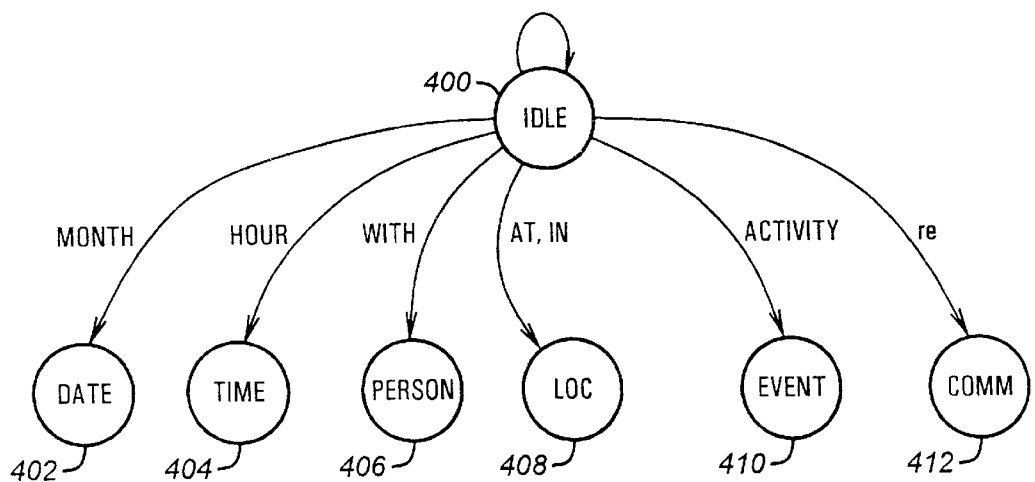
FIG. 29 is a state machine for a parameter state machine of FIG. 28.
Figure 30:
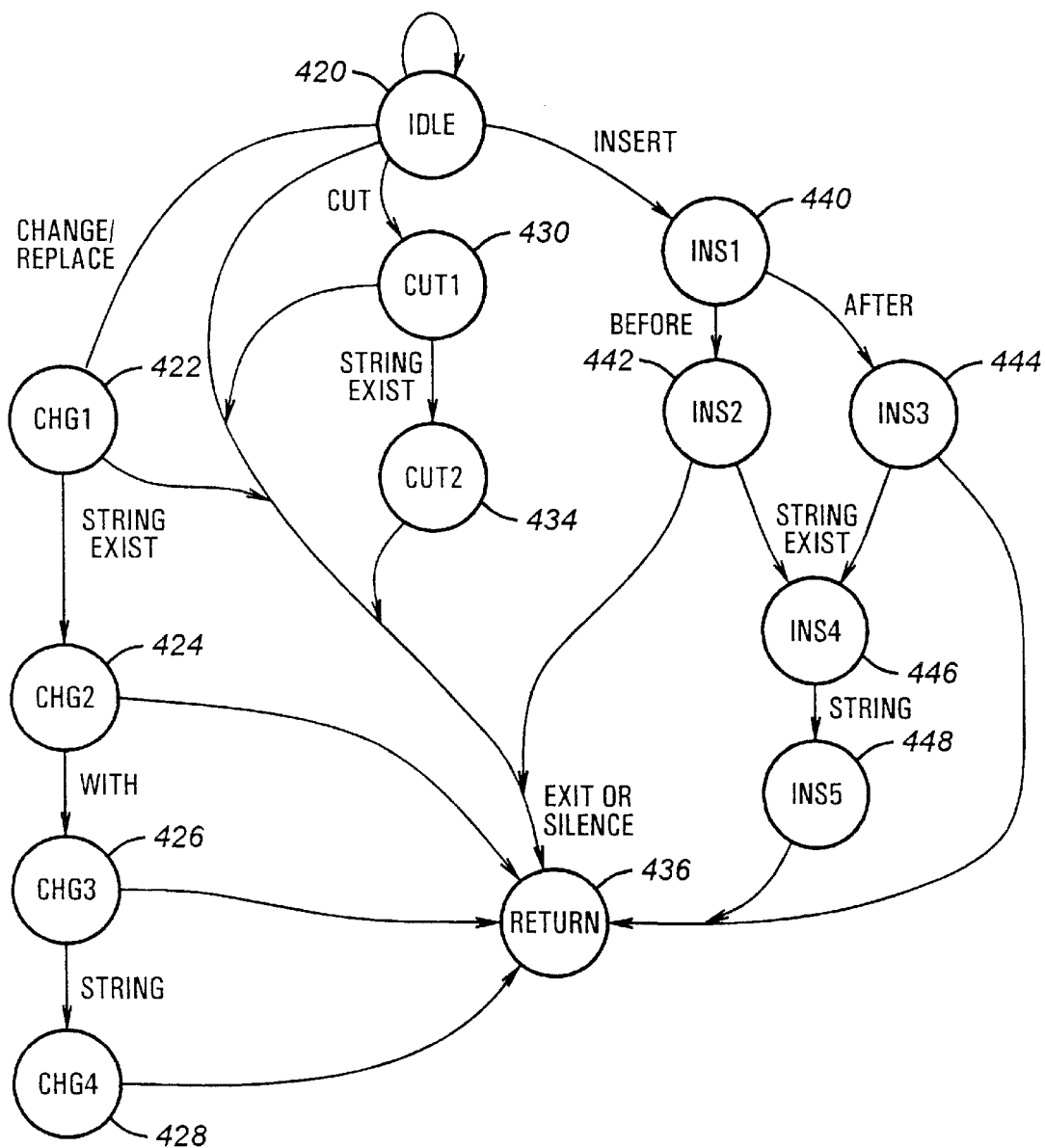
FIG. 30 is a state machine for an edit state machine of FIG. 28.

The operation of the state machine for the PARAM states 374, 380, 386 and 392 utilizes a simplified grammar to specify the calendar data input. The PARAM state is shown in more detail in FIG. 29. From state IDLE 400, if the next utterance is a month, the state transitions to a DATE state 402 to collect the month, the date and/or the year. If the utterance is an hour, the state transitions from the IDLE state to a TIME state 404 to collect the hour and the minute information. If the utterance is "with", the state transitions to a PERSON state 406 to collect the name or names of people involved. If the utterance is "at" or "in", the state machine transitions to a LOC state 408 to receive the location associated with the appointment. If the utterance is an activity such as "meeting", the machine transitions to an EVENT state 410 to mark that an activity has been received. If the utterance is "re", the state machine transitions to a state COMM 412 to collect the comment phrase. Although not shown, after each of the states 402–412 has collected the words expected, the states transition back to the IDLE state 400 to receive other keywords. Upon an extended silence, the PARAM states 374, 380, 386 and 392 transitions to a SAVE state 376, DELETE state 382, SEARCH state 388 and EDIT state 394, respectively. However, if the user utters "cancel", the PARAM states transition back to the IDLE state 370 of FIG. 28.

In the state machine for the calendar appointment system, the grammar for data to be entered into the appointment calendar includes:

< appointment > ::= << time > on < date > | < date > at < time >>
        < description >

< time > ::= < hour > —< minute > —< am|pm >

< date > ::= < weekday > —<< month > < day > —< year >>

< description > ::= < event > —<< with > < ID >> —<< at > < place > —
        < address >> —<< in > < location >> —<< re >
        < word phrase >>

< ID > ::= << name > < name phrase > | < name > and < name > |
        < name >> —<< title > of < dept >> | << title > of
        < company >>

< address > ::= << no. > < street > —< suite > —< city >>

< word phrase > ::= << word > < word phrase >> | < word > where items preceded by the "--" sign indicates that the items are optional and the "|" sign indicates an alternate choice.

In the preferred embodiment, <event> is a noun phrase such as "meeting", "teleconference", "filing deadline", "lunch", etc. The simplified noun phrase grammar may be enhanced to handle a complex phrase:

< noun phrase > ::= < noun > | < adj > < noun phrase > | < adv >
        < adj > < noun phrase > | < noun phrase >
        < post modifier >

When the optional keyword "re" is uttered, the system enters a free text entry mode where the user provides a short phrase describing the event. A phrase structure can be annotated by referencing the part-of-speech of the word in the dictionary. The parsing of the words is performed in two phases: 1) the identification of the simplex and/or complex noun phrases; and 2) the identification of the simplex and/or complex clauses. Because the word preselector generates a number of candidate words making up the short phrase, a parser selects the best combination of candidate words by ranking the grammatical consistency of each possible phrase. Once the candidate phrases have been parsed, the consistency of the elements of the phrases can be ranked to select the most consistent phrase from the candidate phrases. In this manner, the attributes of the part-of-speech of each word are used to bind the most consistent words together to form the phrase which is the object of the utterance "re".

The goal of a speech recognition system is to perform certain tasks accurately and quickly. The recognizer therefore must incorporate facilities for repairing errors and accepting new words to minimize the amount of time that the user needs to spend attending to the mechanics of speech input. FIG. 25 shows the state machine for editing an entry in the calendar PIM. The edit state machine is initialized in an IDLE state 420. If the user issues the "change" or "replace" command, the machine transitions to a CHG1 state 422. If the user utters a valid existing string, the machine transitions to a CHG2 state 424, otherwise it exits through a RETURN state 436. If the user states "with", the machine transitions to CHG3 state 426. Finally, once the user utters the replacement string in CHG4 state 428, the change/replace sequence is complete and the machine replaces the original string with a new string and then transitions to RETURN state 436.

If the user requests "cut", the state machine transitions from the IDLE state 420 to a CUT1 state 430. If the user announces a valid existing string, the machine transitions to a CUT2 state 434 where the selected string is removed before the machine transitions to the RETURN state 436.

If the user requests "insert", the machine transitions from the IDLE state 420 to an INS1 state 440. If the user then announces "before", the machine transitions to an INS2 state 442, or if the user announces "after", the machine transitions to an INS3 state 44. Otherwise, the machine transitions to the RETURN state 436. In INS2 or INS3 states, if the user announces a valid existing string, then the machine transitions to an INS4 state 446, otherwise it transitions to RETURN state 436. In INS state 374, the next string announced by the user is inserted into the appropriate location before it returns to the RETURN state 436.

In the IDLE state 420, if the user specifies "cancel" or if the user is silent for a predetermined duration, the machine transitions to RETURN state 436 where control is transferred back to the machine that invoked the edit state machine. Although a simplified description of the speech editor has been described, one skilled in the art can enumerate on these features to add more modes, including the addition of the command "CAP" to direct the recognizer to capitalize the next word, "CAP WORD" to capitalize the entire word, "CAP ALL" to capitalize all words until the user issues the command "CAP OFF", "NUMBER" to display numerals rather than the word version of the numbers. The user can shift his view port by uttering "SCROLL FORWARD" or "SCROLL BACKWARD". In addition, the user can format the text by the command "NEW PARAGRAPH", "NEW LINE", "INDENT" and "SPACE", optionally followed by a number if necessary.

The user must also be able to rapidly introduce new words into the system vocabulary and have these words be recognized accurately. In particular, the word estimation capability is particularly useful in estimating street names in a PIM directory book and enables a robust directory book without a large street lookup dictionary. The introduction of a new word typically involves not only the modification of the recognition component but also changes in the parser and the semantic interpreter. Typically, a new word to be added to the dictionary is introduced, defined, and used thereafter with the expectation that it will be properly understood. In one embodiment, the user can explicitly indicate to the system to record a new word by saying "NEW WORD", spelling the word verbally or through the keyboard, and then saying "END WORD".

Figure 31:
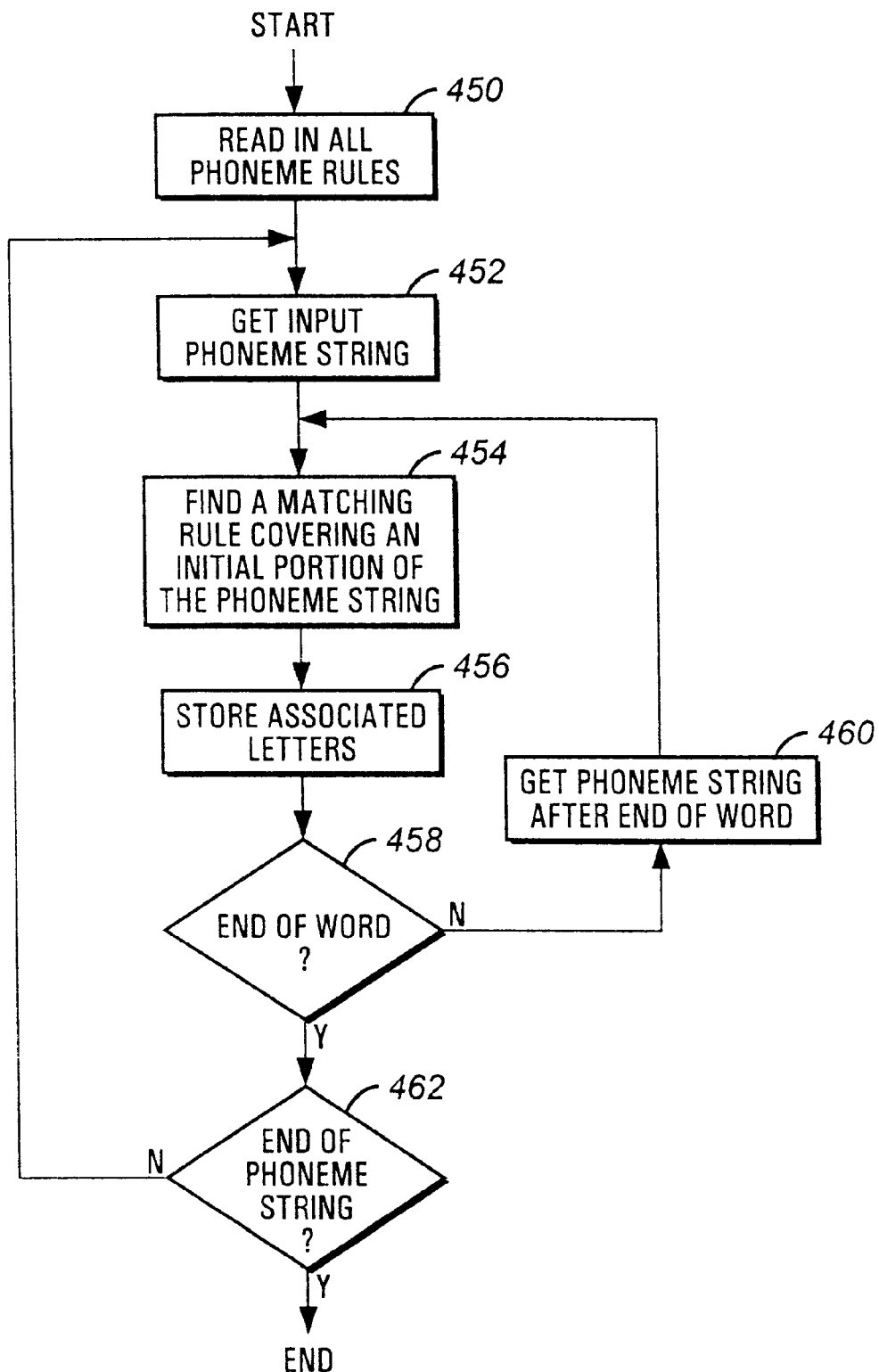
FIG. 31 is a block diagram of an unknown word generator in accordance with yet another aspect of the present invention.

In the event that a word does not exist in the dictionary, the system backs out the spelling of a word from the phonetic content of the word. Thus, in the event the word spoken is not contained in the dictionary, as indicated when the score of the candidate words falls below a predetermined threshold, the speech recognizer initiates a new word generation based on the observed phoneme sequence. The new word generator is shown in FIG. 31. As shown in FIG. 31, upon power-up, the speech recognizer loads a rule database for generating phonemes from the letters in the word and vice versa in step 450. The rules for generating phonemes from letters are well known, and one set of rules is disclosed in Appendix A of E. J. Yannakoudakis and P. J. Hutton's book *Speech Synthesis and Recognition Systems*, hereby incorporated by reference. In step 452, the speech recognizer accepts a string of phonemes from the phoneme recognizer. In step 454, the speech recognizer consults the rule database and finds the matching rules for the phoneme sequence to regenerate the associated letters. In step 456, the associated letters are stored. The end of word, as indicated by an extended silence, is tested in step 458. Alternatively, in the event that the unknown word is part of a continuous speech recognizer without the silence between words, the unknown word can be compared with the entries in a secondary listing of valid English words, such as that found in a spelling checker, using the holographic comparison technique discussed earlier. The secondary listing of valid English words is a compact dictionary which differs from the primary dictionary in that the primary dictionary contains the phoneme sequence of the entry as well as the labels and context guides for each entry. In contrast, the secondary listing only contains the spelling of the entry and thus can compactly represent the English words, albeit without other vital information. If the end of the word is not reached, the speech recognizer gets the next phoneme sequence in step 460, otherwise it moves to step 462. In step 462, if the end of the phoneme string is reached, the word generator is finished, otherwise it loops back to step 452. In this manner, the speech recognizer is capable of generating new words not in its primary vocabulary.

As discussed above, the feature extractor, the phoneme recognizer, and the preselector code form one or more candidates for the word generator to select the candidate closest to the spoken word based on a statistical model or a grammar model. Further, when a word is not stored in the dictionary, the speech recognizer is capable of estimating the word based on the phonetic labels. Hence, the described speech recognizer efficiently and accurately recognizes a spoken word stored in its dictionary and estimates the word in the absence of a corresponding entry in the dictionary.

The words selected by the syntax checker is presented to the user for acceptance or rejection through a voice user interface. The preferred embodiment of the invention uses an interactive protocol that packs the disconfirmation of the current utterance into the next utterance. In this protocol, the user speaks an utterance which is recognized and displayed by the recognizer. If the recognition is correct, the user can speak the next utterance immediately. However, if the recognition is incorrect, the user speaks a special disconfirmation word and repeats the utterance. If the computer recognizes the disconfirmation portion of the utterance, it loops back to the beginning to recognize the next word as a replacement for the currently. However, if the computer does not recognize the disconfirmation, it performs the action requested in the original utterance and continues on to the next utterance. The disconfirmation can be a constructive emphasis wherein the correction mechanism is a repetition of the original utterance. Alternatively, the user can actively provide the context by repeating the misrecognized word together with its left and right words. Another means to correct misrecognized speech is to type using a keyboard input. The use of keyboard data entry can be particularly effective for long verbal input where the cost of speech and keyboard editing as a whole is less than that of keyboard data entry.

Thus, there has been shown and described a low power, robust speech recognizer for portable computers. Although the preferred embodiment addresses only the appointment calendar aspects of the PIM system, one skilled in the art can implement a speech capable PIM versions of telephone directory, the personal finance management system, and the notepad for jotting down notes, among others. Further, the grammar checking capability of the invention is applicable to large vocabulary dictation applications. It is to be recognized and understood, however, that various changes, modifications and substitutions in the form and of the details of the present invention may be made by those skilled in the art without departing from the scope of the following claims:

I claim:

1. A computer system having a power-down mode to conserve energy, comprising:

a speech transducer for capturing speech;

a low power wake-up indicator coupled to said speech transducer, said wake-up indicator detecting speech directed at said speech transducer and asserting a wake-up signal to a powered-down processor, the low power wake-up indicator having a low pass filter and a power comparator coupled to the low pass filter; and a voice recognizer coupled to said speech transducer and said wake-up signal, said voice recognizer waking up from the power-down mode when said wake-up signal is asserted.

2. The computer system of claim 1, wherein said power wake-up indicator includes a half-wave rectifier.

3. The computer system of claim 1, wherein said power wake-up indicator includes a root-mean-square device.

4. The computer system of claim 1, wherein said speech transducer includes a microphone and a noise canceller which characterizes the background noise when a user is not speaking and subtracts the background noise when the user is speaking to the computer.

5. The computer system of claim 1, wherein said speech transducer includes a microphone and a noise canceller.

6. The computer of claim 1, wherein the speech transducer is contained in a wearable housing.

7. The computer of claim 1, wherein the speech transducer is contained in a watch.

8. A computer system having a power-down mode to conserve energy comprising:

a speech transducer for capturing speech;

a neural network coupled to said speech transducer, said neural network detecting speech directed at said speech transducer and asserting a wake-up signal to a powered-down processor; and a voice recognizer coupled to said speech transducer and said wake-up signal, said voice recognizer waking up from the power-down mode when said wake-up signal is asserted.

9. The computer of claim 8, wherein the speech transducer is contained in a wearable housing.

10. The computer of claim 8, wherein the speech transducer is contained in a watch.

* * * * *